US008301536B2

(12) United States Patent
Fulshaw et al.

(10) Patent No.: US 8,301,536 B2
(45) Date of Patent: Oct. 30, 2012

(54) COMPUTERIZED METHODS AND APPARATUSES FOR GUIDING A USER THROUGH A TRANSACTION TO CHANGE A CONTRIBUTION CONFIGURATION IN A DEFINED CONTRIBUTION PLAN

(75) Inventors: Susan L. Fulshaw, Concord, MA (US); Jodi Vivian Leo, Wakefield, RI (US); Jennifer Ann Lund, Mansfield, MA (US); Michael Frank Tuccinard, Shrewsbury, MA (US); Steven Edward Borowick, Gloucester, MA (US); Fiona J. Tranquada, Somerville, MA (US); Jonathan Daniels Weinert, Concord, MA (US); Ellen Beth Pedersen, Medfield, MA (US)

(73) Assignee: FMR LLC, Boston, MA (US)

( * ) Notice: Subject to any disclaimer, the term of this patent is extended or adjusted under 35 U.S.C. 154(b) by 680 days.

(21) Appl. No.: 12/334,435

(22) Filed: Dec. 12, 2008

(65) Prior Publication Data

US 2010/0153298 A1 Jun. 17, 2010

(51) Int. Cl.
*G06Q 40/00* (2012.01)
(52) U.S. Cl. .................. 705/36 R; 705/35; 705/7; 705/1
(58) Field of Classification Search ................ 705/1, 36, 705/36 R
See application file for complete search history.

(56) References Cited

U.S. PATENT DOCUMENTS

| | | | |
|---|---|---|---|
| 5,960,411 A | 9/1999 | Hartman et al. | 705/26 |
| 2001/0037276 A1 | 11/2001 | Kelly et al. | 705/36 |
| 2002/0035527 A1 | 3/2002 | Corrin | 705/35 |
| 2002/0138386 A1* | 9/2002 | Maggioncalda et al. | 705/36 |
| 2003/0105692 A1 | 6/2003 | Gilbert et al. | 705/35 |
| 2003/0182147 A1* | 9/2003 | Mahoney et al. | 705/1 |
| 2003/0229522 A1 | 12/2003 | Thompson et al. | 705/4 |
| 2004/0049397 A1 | 3/2004 | Leisure et al. | 705/1 |
| 2005/0010516 A1* | 1/2005 | Ivanov et al. | 705/36 |
| 2005/0027632 A1* | 2/2005 | Zeitoun et al. | 705/36 |
| 2006/0080200 A1 | 4/2006 | Ashton et al. | 705/35 |
| 2006/0095307 A1* | 5/2006 | Stevenson et al. | 705/7 |
| 2007/0061237 A1 | 3/2007 | Merton et al. | 705/36 |
| 2010/0094778 A1* | 4/2010 | Wagner | 705/36 R |

OTHER PUBLICATIONS

Prudential Retirement Website Review, May 2007, 2 pages.
"Prudential Retirement Revamps 'Participant Website' to Help Individuals Achieve a More Secure Retirement." available at http://www.findarticles.com, May 23, 2007, 1 page.
Mass Mutual "The Journey" login screen, available at https://wwwrs.massmutual.com/journey/Login.aspx. retrieved on Oct. 6, 2008, 1 page.
"MassMutual Announces Web Site Enhancement That Helps Employees Save for Retirement Sooner," available at http://www.reuters.com, Jun. 12, 2008, 3 pages.

(Continued)

*Primary Examiner* — Samica L Norman
(74) *Attorney, Agent, or Firm* — Proskauer Rose LLP

(57) ABSTRACT

Described are computer-based methods and apparatuses, including computer program products, for guiding a user through a transaction to change a contribution configuration in a defined contribution plan. A request is received by an application from a client device. The application processes the request and plan data associated with a user is retrieved. User interface data is generated by the application and the data is transmitted to the client device. A user interface is displayed which initiates, reviews and executes a transaction to change a current contribution configuration to a suggested contribution configuration without requiring the user to enter any additional information.

17 Claims, 15 Drawing Sheets

OTHER PUBLICATIONS

Easytec Systems 401k Enginuity Product Overview, available at http://401kenginuity.com, retrieved on Oct. 6, 2008, 6 pages.

Financial Engines Advice Engines, available at http://www.financialengines.com, retrieved on Oct. 6, 2008, 1 page.

Putnam Investments: Technology, available at https://content.mercerhrs.com/content/assembler/Template/shared/html/services/participant_technology.htm. last retrieved on Oct. 6, 2008, 1 page.

Putnam Investments iBenefitCenter screenshot, available at http://www.kevinmoffitt.com/portfolio/enrollment.gif. last retrieved on Oct. 6, 2008, 1 page.

Kevin Moffitt, Project Portfolio, available at http://www.kevinmoffitt.com/portfolio/projects.htm, retrieved on Oct. 6, 2008, 2 pages.

Putnam Insight® User Guide from Putnam Investments, Feb. 2007, 12 pages.

International Search Report and Written Opinion from PCT Application No. PCT/US08/86726, Nov. 8, 2010, 9 pages.

* cited by examiner

FIG. 11 myPlan | myPlan invest

Fidelity's investment recommendations for you

● Based on your current age and retirement at 67, your portfolio asset mix may be significantly off target We recommend an aggressive-growth portfolio.

Here's what you can do:

An all-in-one solution.
- Freedom Fund 2040
  Get a single diversified lifecycle fund that closely matches your expected retirement date.
  Be comfortable knowing you're on track to meet your goals.

[Freedom Fund 2040]

You can do it with our help.
- Portfolio Review
  Evaluate and adjust your portfolio using some of our investment ideas.
  See how Fidelity can help you create a smarter investment strategy in 20 minutes.

[Portfolio Review]

1110
1120
1100

COMPUTERIZED METHODS AND APPARATUSES FOR GUIDING A USER THROUGH A TRANSACTION TO CHANGE A CONTRIBUTION CONFIGURATION IN A DEFINED CONTRIBUTION PLAN

FIELD OF THE INVENTION

The present invention relates generally to computer-based methods and apparatuses, including computer program products, for guiding a user through a transaction to change a contribution configuration in a defined contribution plan.

BACKGROUND

With the availability of Social Security benefits facing an uncertain future, amassing one's own personal savings for retirement is quickly becoming essential for a large majority of Americans who hope to remain living in the style to which they are accustomed. Many people depend on employer-sponsored retirement plans, such as those provided pursuant to Sections 401(k) or 403(b) of the Internal Revenue Service code, to provide them with the adequate financial support they desire. Under the structure of such "defined contribution plans", an employee will contribute personal funds to an account in the plan over his or her working life—often contributing to the account a designated amount or percentage of each paycheck—while a financial institution or other plan provider invests the contributions in financial securities, such as mutual funds selected by the employee, and manages the assets with the employee bearing the investment risk. In some defined contribution plans, the employee can choose from several pre-defined asset allocation portfolios, configured by the financial institution to offer different levels of investment risk. In some defined contribution plans, the employer agrees to match any contribution by the employee up to a certain amount or percentage, having the effect of "doubling" at least a portion of the employee's contribution each pay period.

However, many people do not take advantage of such retirement plans—thereby missing out on "free money" matched contributions from their employers—because they see the process of designating a contribution amount and selecting among the various investment options confusing and/or time-consuming. Some employers do not provide any self-service interface for employees to view and manage their retirement accounts, instead sometimes requiring a manual process of filling out forms. Other employers offer cumbersome benefits interfaces, which may be seen by the employee as an impediment to efficient management of that employee's defined contribution plan. Still others provide interfaces that contain a dizzying array of financial tools, graphs, charts and forecasts that could serve to confuse the average plan participant investor. Therefore, it is difficult to get existing and potential plan participants to engage themselves in planning for retirement. Additionally, many employees who do participate in employer-sponsored retirement plans do not fully understand the short-term and long-term financial impact of making a change to their contribution configuration. This lack of understanding can lead to less-than-optimal investment choices, both in terms of investment selection and contribution percentage.

What is needed is a simplified method and system to guide a user through the process of changing a contribution configuration in a defined contribution plan and showing the user a limited set of information which is essential in helping the user understand how a change to a contribution configuration affects both short-term and long-term financial planning and retirement savings goals.

SUMMARY OF THE INVENTION

The description describes methods and apparatuses, including computer program products, for guiding a user through a transaction to change a contribution configuration in a defined contribution plan. The description includes techniques that can be used to guide a user through a transaction to change a contribution configuration in a defined contribution plan.

In one aspect, there is a computerized method for guiding a user through a transaction to change a contribution configuration in a defined contribution plan. A request from a client device is received. The request includes credentials associated with a user. The request is processed by the first computing device. The processing comprises retrieving plan data based on the credentials from a storage module, including at least a current contribution configuration, and determining a suggested contribution configuration based on at least a portion of the plan data without any additional user input. First user interface data is transmitted to the client device. The first user interface data is configured to cause the client device to display, on a first user interface frame, at least a portion of the plan data, the suggested contribution configuration, and a first button which enables the user to initiate a transaction to change the current contribution configuration to the suggested contribution configuration without requiring the user to enter any additional information. In response to receiving information indicative of clicking the displayed first button, the transaction to change the current contribution percentage to the suggested contribution percentage is executed. Confirmation data is transmitted to the client device. The confirmation data is configured to cause the client device to display a confirmation of the transaction without any additional user input.

In another aspect, there is a system for guiding a user through a transaction to change a contribution configuration in a defined contribution plan. The system includes an application server executing an application and a client computing device. A request from a client device is received by the application. The request includes credentials associated with a user. The request is processed by the application. The processing comprises retrieving plan data based on the credentials from a storage module, including at least a current contribution configuration, and determining a suggested contribution configuration based on at least a portion of the plan data without any additional user input. First user interface data is transmitted to the client device. The first user interface data is configured to cause the client device to display, on a first user interface frame, at least a portion of the plan data, the suggested contribution configuration, and a first button which enables the user to initiate a transaction to change the current contribution configuration to the suggested contribution configuration without requiring the user to enter any additional information. In response to receiving information indicative of clicking the displayed first button, the transaction to change the current contribution percentage to the suggested contribution percentage is executed. Confirmation data is transmitted to the client device. The confirmation data is configured to cause the client device to display a confirmation of the transaction without any additional user input.

In another aspect, there is a computer program product for guiding a user through a transaction to change a contribution configuration in a defined contribution plan. The computer program product is tangibly embodied in a computer readable medium. The computer program product includes instructions being operable to cause data programming apparatus to receive a request from a client device. The request includes credentials associated with a user. The request is processed. The processing comprises retrieving plan data based on the credentials from a storage module, including at least a current contribution configuration, and determining a suggested contribution configuration based on at least a portion of the plan data without any additional user input. First user interface data is transmitted to the client device. The first user interface data is configured to cause the client device to display, on a first user interface frame, at least a portion of the plan data, the suggested contribution configuration, and a first button which enables the user to initiate a transaction to change the current contribution configuration to the suggested contribution configuration without requiring the user to enter any additional information. In response to receiving information indicative of clicking the displayed first button, the transaction to change the current contribution percentage to the suggested contribution percentage is executed. Confirmation data is transmitted to the client device. The confirmation data is configured to cause the client device to display a confirmation of the transaction without any additional user input.

In some examples, any of the aspects can include one or more of the following features. The contribution configuration can represent an apportionment of money contributed by a participant to a defined contribution account in a defined contribution plan. The current contribution configuration can include a current contribution percentage, a current investment selection, or both. The suggested contribution configuration can include a suggested contribution percentage, a suggested investment selection, or both.

In other examples, second user interface data can be transmitted to the client device in response to receiving information indicative of clicking the first button. The second user interface data can be configured to cause the client device to display, on a second user interface frame, the current contribution configuration, the suggested contribution configuration, and a second button, the second button enabling the user to review the transaction to change the current contribution configuration to the suggested contribution configuration without requiring the user to enter any additional information.

In some examples, third user interface data can be transmitted to the client device in response to receiving information indicative of clicking the second button. The third user interface data can be configured to cause the client device to display, on a third user interface frame, the current contribution configuration, the suggested contribution configuration, and a third button, the third button enabling the user to execute the transaction to change the current contribution configuration to the suggested contribution configuration without requiring the user to enter any additional information.

In some examples, salary data associated with a user can be retrieved from a database. A change in periodic earnings reduction amount and a change in periodic employer contribution amount associated with the suggested contribution percentage and based on the salary data can be determined. User interface data can be transmitted to the client device. The user interface data can be configured to cause the client device to display the change in periodic earnings reduction amount and the change in periodic employer contribution amount without any additional user input.

In other examples, user input can be received from the client device. The user input can include, for example, salary data. A change in periodic earnings reduction amount and a change in periodic employer contribution amount associated with the suggested contribution percentage and based on the salary data can be determined upon clicking a salary button. User interface data configured to cause the client device to display the change in periodic earnings reduction amount and the change in periodic employer contribution amount without any additional user input can be transmitted to the client device.

In some examples, user interface data can be transmitted to the client device. The user interface data can be configured to cause the client device to display a graphical depiction of a projected future asset amount based on the suggested contribution percentage. The projected future asset amount can be determined according to current age, age at retirement, length of retirement period, goal amount, savings to date, inflation rate, salary growth, additional employer contributions, historic market performance, income replacement, tax limitations, Social Security income, portfolio asset allocation, investment risk, or any combination thereof.

In other examples, user interface data can be transmitted to the client device. The user interface data can be configured to cause the client device to display a slider button comprising a range of available contribution percentage values starting with the current contribution percentage. A change in periodic earnings reduction amount, based on the percentage value associated with the slider button, can be determined in response to receiving information indicative of manipulating the slider button. User interface data configured to cause the client device to display a change in the periodic earnings reduction amount, based on the percentage value associated with the slider button can be transmitted to the client device. The range of available contribution percentage values can end with a maximum allowable percentage value. The maximum allowable percentage value can be based on contribution plan rules, governmental rules, taxation rules, or any combination thereof.

In still other examples, user interface data can be transmitted to the client device. The user interface data can be configured to cause the client device to display the graphical depiction of a projected future asset amount based on the current contribution percentage, the percentage value associated with the slider button, or both. A change in the projected future asset amount based on the percentage value associated with the slider button can be determined in response to receiving information indicative of manipulating the slider button. User interface data configured to cause the client device to display a change in the graphical depiction of a projected future asset amount based on the percentage value associated with the slider button can be transmitted to the client device.

In some examples, user interface data can be transmitted to the client device in response to receiving information indicative of manipulating the slider button. The user interface data can be configured to cause the client device to display a review button which enables the user to review a transaction to change the current contribution percentage to the percentage value associated with the slider button without requiring the user to enter any additional information. User interface data configured to cause the client device to display the current contribution percentage, the suggested contribution percentage, and an execute button which enables the user to execute the transaction to change the current contribution percentage to the suggested contribution percentage can be transmitted to the client device in response to receiving information indicative of clicking the review button and without requiring the user to enter any additional information. The transaction to change the current contribution percentage to the suggested contribution percentage can be executed in response to receiving information indicative of clicking the execute button. Confirmation data configured to cause the client device to display a confirmation of the transaction without any additional user input can be transmitted to the client device. In some examples, the confirmation can include a confirmation number.

In other examples, the current contribution percentage can be determined to be less than, equal to, or greater than the employer match percentage retrieved from a database. In some examples, the determining the current contribution percentage is less than the employer match percentage includes setting the suggested contribution percentage equal to the employer match percentage.

In some examples, a current age of the user and an age at retirement of the user can be retrieved from a storage device. A suggested investment selection can be determined based on a current investment selection, the current age of the user, and the suggested age of the user. User interface data can be transmitted to the client device. The user interface data can be configured to cause the client device to display the suggested investment selection and an execute button enabling the user to execute the transaction to change the current investment selection to the suggested investment selection without any additional user input. The transaction to change the current investment selection to the suggested investment selection can be executed in response to receiving information indicative of clicking the execute button. Confirmation data configured to cause the client device to display a confirmation of the transaction without any additional user input can be transmitted to the client device.

In other examples, determining a suggested investment selection can include determining an age-based time horizon and/or a risk profile of the user. The age-based time horizon and/or risk profile can be based on the current age of the user and the age at retirement of the user. The suggested investment selection can be adjusted and/or rebalanced automatically based on the age-based time horizon and/or risk profile. The risk profile can include an aggressive investment risk strategy, a moderate investment risk strategy, a conservative investment risk strategy, or any combination thereof.

In some examples, the user interface can include less than fifty words. In other examples, the user interface can include a button to cancel an unexecuted change. In still other examples, the user interface can include a button to enable the user to substitute temporary values for at least a portion of the plan data.

Any of the examples described herein can include one or more of the following advantages. Since the application has access to all of the pertinent account and employment data of the user, the user can receive a personalized analysis of his or her contribution configuration in an employer-sponsored retirement contribution plan without having to answer any demographic or financial questions. The user interface only displays information essential to making a decision on whether to adjust one's contribution configuration, and the user can quickly update the contribution configuration though the simplified user interface with only a few clicks of the mouse. These techniques provide the advantage of encouraging more employees, especially those who feel current applications are too cumbersome or confusing, to utilize the application.

Moreover, the user can view a detailed depiction of how a contribution configuration change would impact not only his or her short-term savings goals (e.g., effect on take-home pay), but also progress toward long-term savings goals (e.g., projected asset value and income at retirement age). The application can show the user how much progress he or she would make toward the long-term goal due to potential plan changes. For example, the user can simply adjust the suggested contribution percentage and instantly see the financial ramifications of that adjustment. As a result, the user can quickly determine if contributing a particular percentage would be in his or her best interests, according to personal needs and goals.

The application can also identify an investment selection based on user information (e.g., current age, age at retirement) that could prove more beneficial, and the application can re-allocate money in the contribution plan according to that selection. The user does not have to conduct independent research on the advantages and disadvantages of placing funds in a particular investment security, and also need not worry about whether a specific investment selection aligns with desired retirement objectives.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features and advantages of the present invention, as well as the invention itself, will be more fully understood from the following description of various embodiments, when read together with the accompanying drawings.

FIG. 11 is a screenshot of an exemplary user interface for initiating a transaction to change an age-appropriate investment selection in a defined contribution plan.

DETAILED DESCRIPTION

In general overview, the described methods and apparatuses are for guiding a user holistically through a transaction to change a contribution configuration (e.g., a contribution percentage and/or an investment selection), understand retirement needs, and review investments in a defined contribution plan. In some examples, the transaction can be a transaction to change a current contribution percentage to an employer match percentage (see Use Case 1 below). In other examples, the transaction can be a transaction to change a current contribution percentage to a suggested contribution percentage beyond the employer match percentage (see Use Case 2 below). In still other examples, the transaction can be a transaction to change a current investment selection to a suggested investment selection (see Use Case 3 below).

Figure 1:
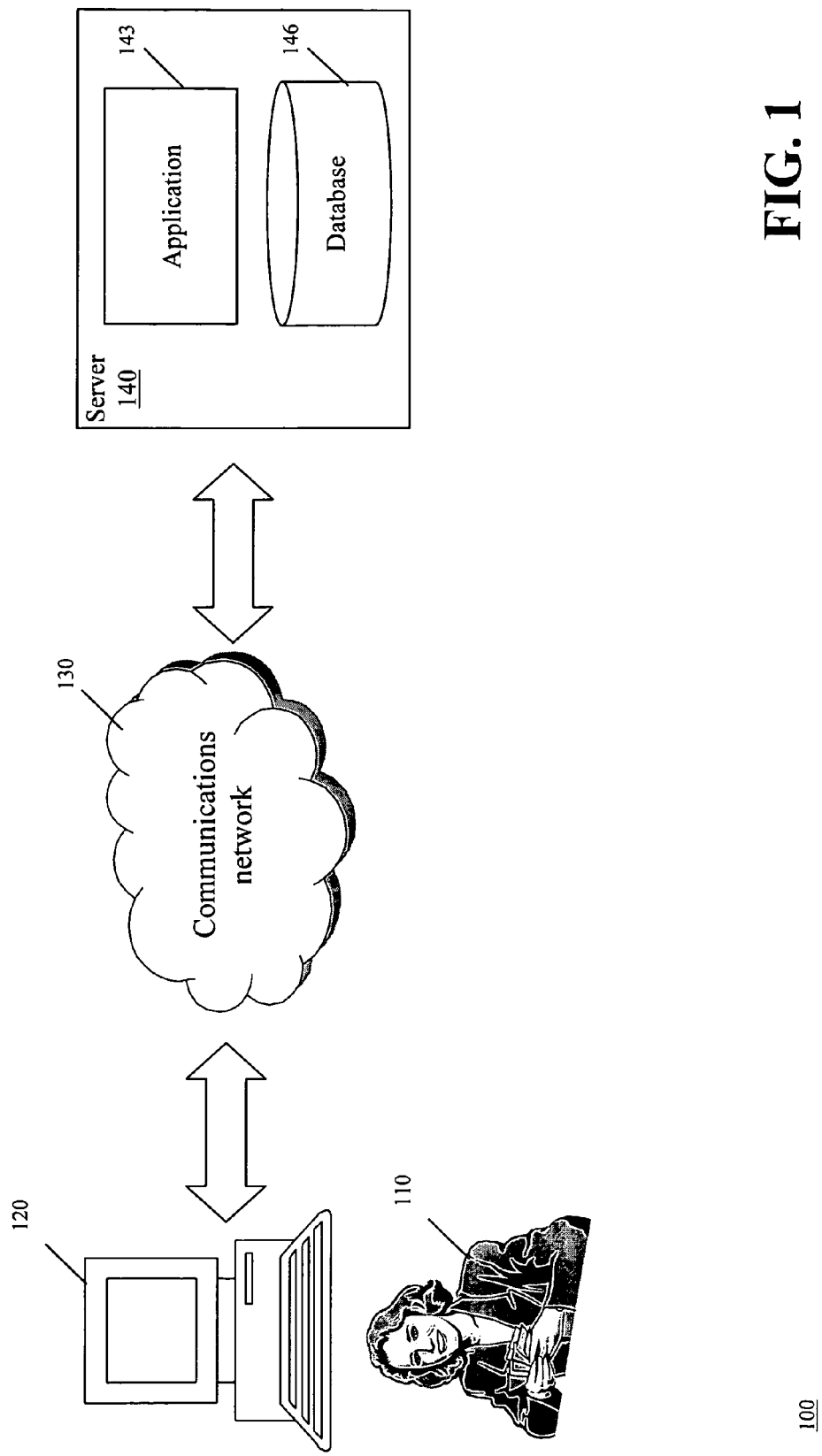
FIG. 1 is a block diagram of an exemplary system for guiding a user through a transaction to change a contribution configuration in a defined contribution plan.

FIG. 1 is a block diagram showing an exemplary system 100 for guiding a user through a transaction to change a contribution configuration in a defined contribution plan. The system 100 includes a computing device 120, a communications network 130, and a server 140 hosting an application 143 and a database 146 in communication with the application 143. The application 143 and the associated database 146 can reside on the same server 140 or on different servers communicating on a communications network, for example, communications network 130.

A user 110 can interact with the system 100 by opening a Web browser on the client device 120 and entering the address of the server 140. The user 110 can log in to the application 143 by providing credentials to the Web browser. The credentials can include, for example, one or more of the following: a username, user ID, password, personal identification number (PIN), certificate, pass code, encryption key, or other similar authentication data. The application 143 receives a request from the client device 120 which can contain the credentials. As an example, the application 143 can authenticate the user 110 by comparing the credentials with pre-stored credential information. Once the application 143 authenticates the user 110, the application 143 processes the request and retrieves plan data associated with the user 110 from the database 146. The application 143 generates user interface data and transmits a user interface based on the user interface data to the client device 120 for display to the user 110. For example, the application 143 can be an application that retrieves contribution plan data and user data (e.g., investment options, contribution percentages, current age, age at retirement, etc.), provides a simplified interface with a limited set of user inputs and text, graphical and/or textual depictions projecting the potential cost (e.g., a reduction in take-home pay) and savings (e.g., a short-term change in plan asset amount or a long-term change in income at retirement) associated with a suggested change to the contribution configuration (e.g., a change to the contribution percentage or the investment selection), a transaction mechanism to execute a change to the contribution configuration, and other similar functionality. For example, the application can be Fidelity myPlan® online retirement planning tool offered by Fidelity Investments of Boston, Mass.

In some examples, the application 143 and database 146 can be hosted by a retirement plan record keeper which maintains all of the plan data required by the application 143 without reference to any other data sources. The record keeper can retrieve the plan data from various internal and/or external sources, and host a central repository for all of the data. The record keeper can be a financial institution, bank, brokerage firm, investment advisor, or other similar entity. Data stored in the database 146 can include general contribution plan data, plan configuration data, employer contribution data, employer plan investment options, employee contribution data, employee salary and benefits data, user demographic data (e.g., current age, age at retirement), user contact data, and other similar data.

Figure 2:
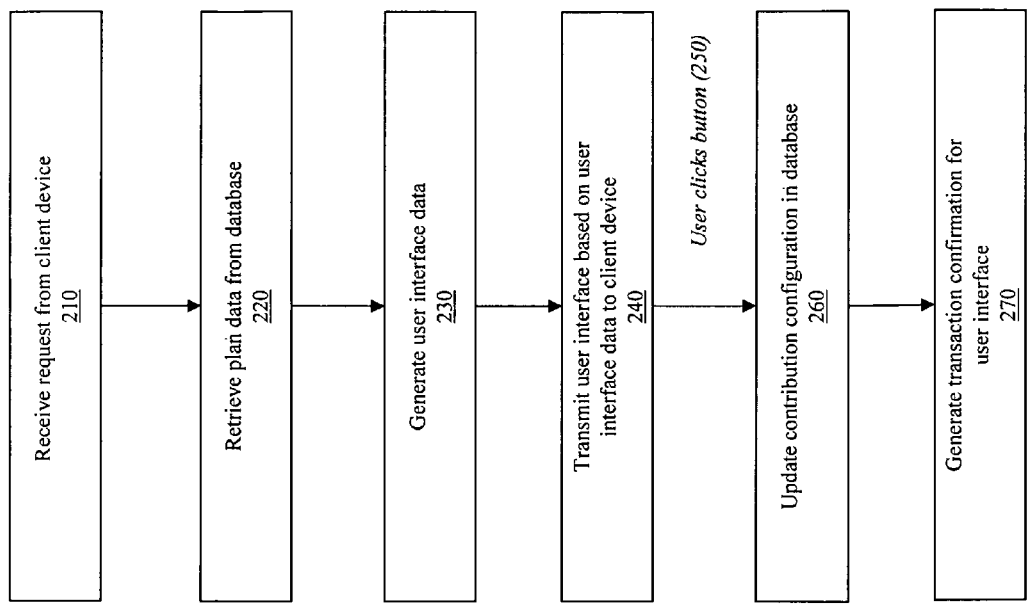
FIG. 2 is a flow diagram of an exemplary method for guiding a user through a transaction to change a contribution configuration in a defined contribution plan.

FIG. 2 is a flowchart 200 of an exemplary method for guiding a user through a transaction to change a contribution configuration in a defined contribution plan. The application 143 receives (210) a request from a client device 120. The application 143 then retrieves (220) plan data from a database 146. The application 143 generates (230) user interface data being configured to cause the client device 120 to display a transaction initiation screen and transmits (240) the user interface data to the client device 120. The user 110 clicks (250) a button to proceed with the transaction and the application 143 updates (260) the contribution configuration in the database 146 and generates (270) user interface data being configured to cause the client device 120 to display a transaction confirmation screen.

The contribution configuration can be a representation of money contributed by a plan participant to a defined contribution account in a defined contribution plan. The contribution configuration can represent, for example, the percentage of earnings contributed periodically to the plan (i.e., how much an employee elects to have deducted from his or her paycheck and deposited in the defined contribution account each pay period). The contribution configuration can represent, for example, the selection of an investment option for the periodic contribution across a single investment fund (e.g., an age-based fund whose asset allocation changes automatically over time to change the risk profile based on the target age of the hypothetical investor for whom the fund is managed) or an investment fund mix (i.e. which investment option or options will be selected to receive money contributed by the employee from among the available investment options of the plan).

FIGS. 3 through 6 are screenshots of an exemplary user interface for guiding a user through a transaction to change a contribution percentage to an employer match percentage in a defined contribution plan. The screenshots are generated by the application 143 and displayed on the client device 120 of FIG. 1.

Figure 3:
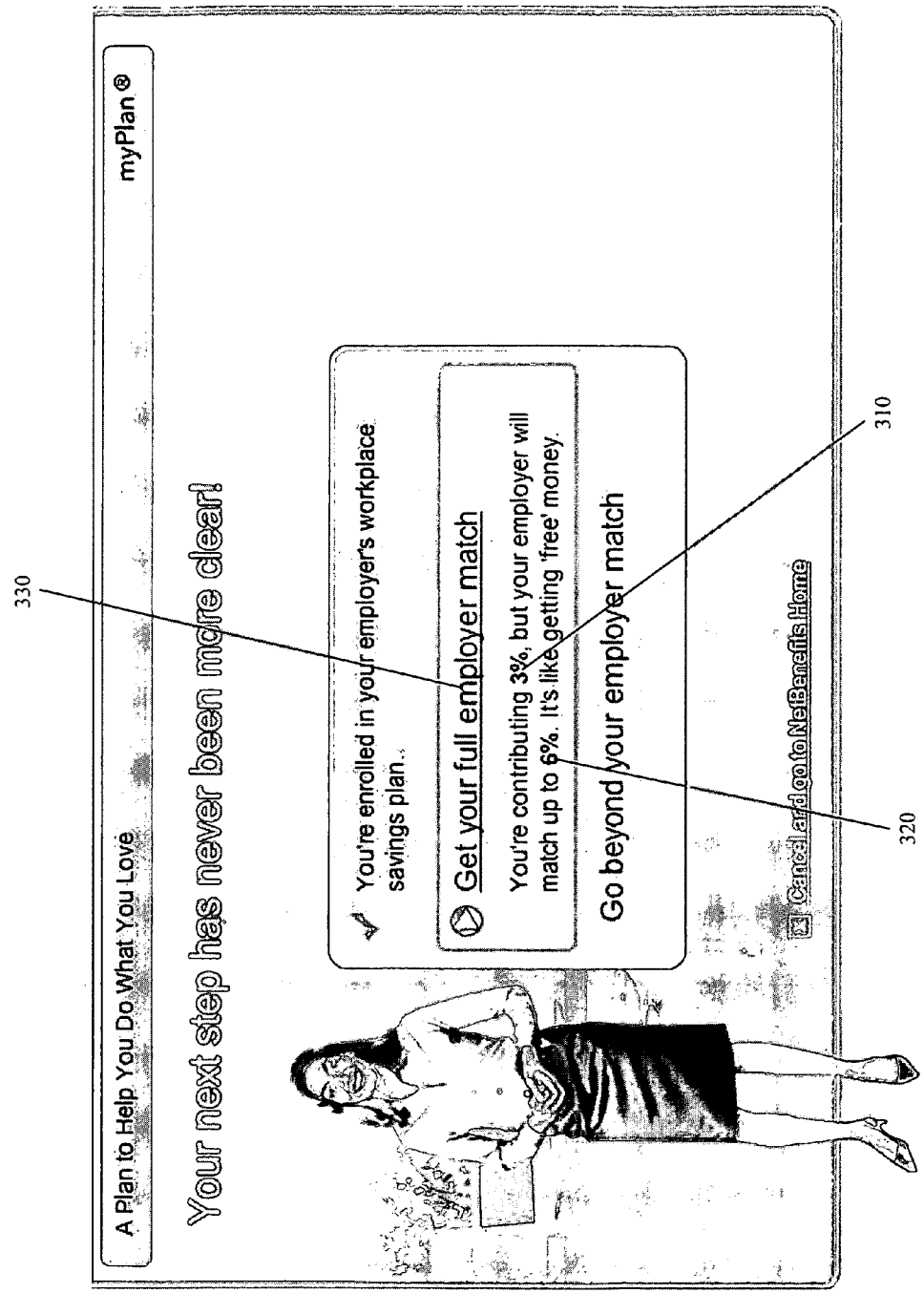
FIG. 3 is a screenshot of an exemplary user interface for initiating a transaction to change a contribution percentage in a defined contribution plan.

FIG. 3 is a screenshot of a transaction initiation screen 300 of an exemplary user interface generated by the application 143. For example, the transaction can be one to change a current contribution percentage 310 to a suggested contribution percentage 320 when the current contribution percentage 310 is less than an employer match percentage. When the user 110 logs in to the application 143, the application 143 can generate user interface data being configured to cause the client device 120 to display the transaction initiation screen 300 after retrieving plan data from a database 146. The transaction initiation screen 300 can display, for example, the user's current contribution percentage 310, the suggested contribution percentage 320, and a button 330 to enable the user 110 to initiate a transaction to change the current contribution percentage 310 to the suggested contribution percentage 320 without requiring the user 110 to enter any additional information. The term button is used herein to generally mean an element of a user interface with which a user can interact to cause the application 143 to react. Such elements are known in the art. For example, a button can be a hyperlink and/or a graphical button and the interaction by the user (e.g., clicking on and/or selecting the button) can be moving a cursor using a mouse, trackball, and/or other pointing input device of a computing device over the button and clicking a physical button on the pointing device to select the hyperlink and/or graphical button.

Figure 4A:
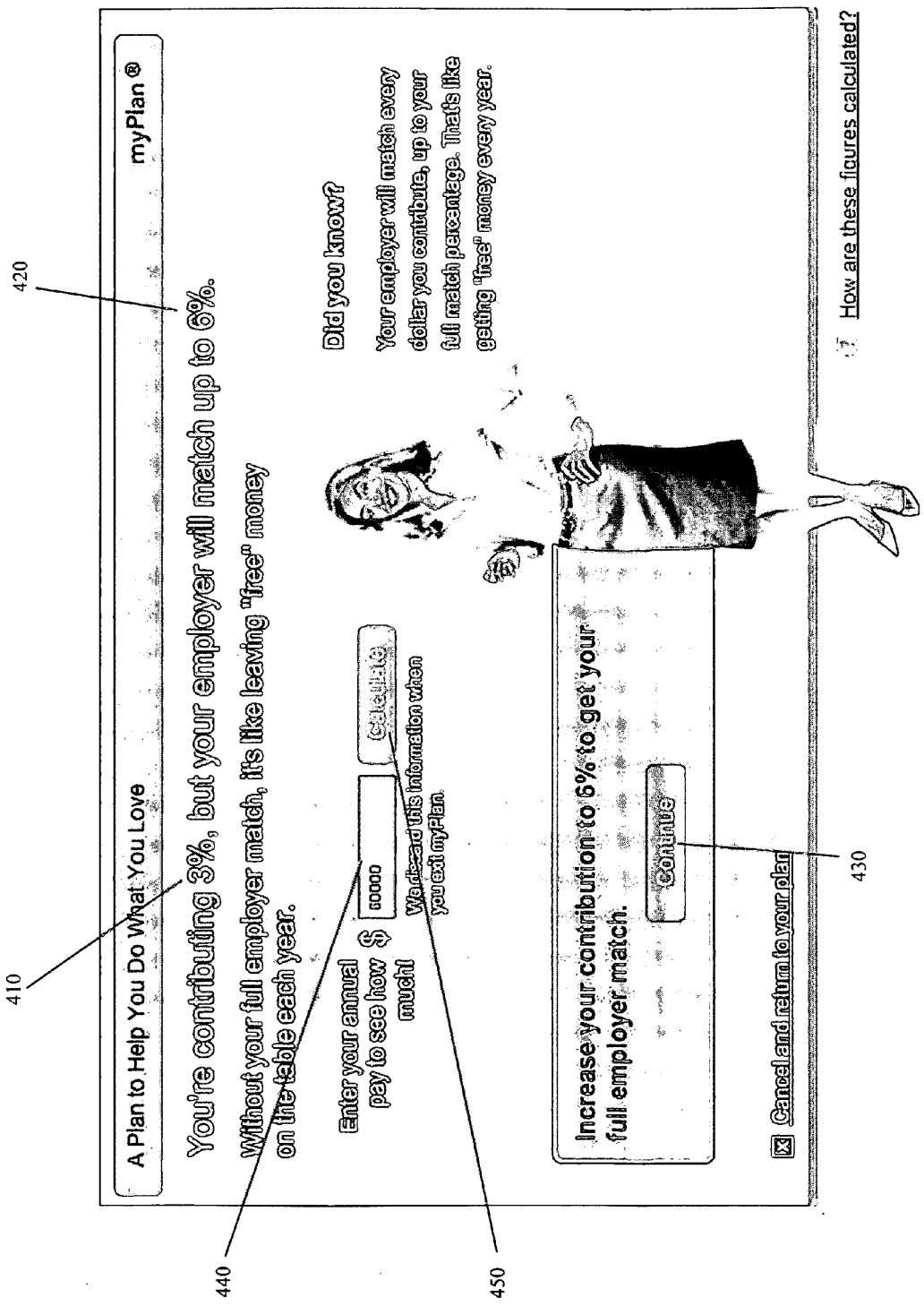
FIGS. 4A and 4B are screenshots of an exemplary user interface for displaying plan data, including a current contribution percentage, a suggested contribution percentage, a periodic salary reduction amount and a periodic plan asset increase amount.
Figure 4B:
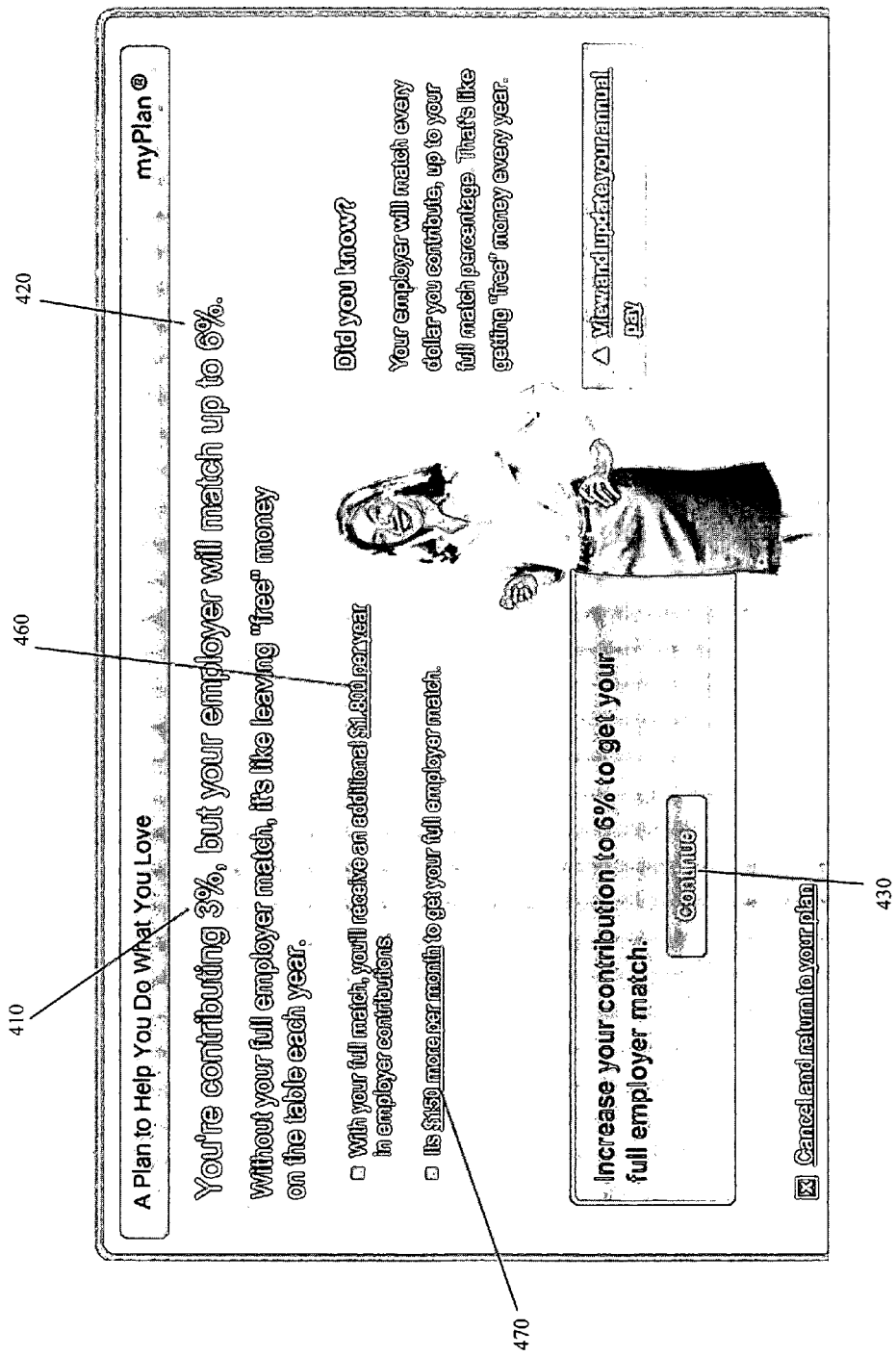

FIGS. 4A and 4B are exemplary screenshots of a transaction overview screen 400 of an exemplary user interface generated by the application 143. The screenshots represent the transaction overview screen 400 at different points based on an interaction made with the screen 400 by the user 110. When the user 110 clicks the button 330, the application 143 can display the transaction overview screen 400. The transaction overview screen 400 can include the current contribution percentage 410, the suggested contribution percentage 420, and a button 430 to enable the user 110 to review the transaction to change the current contribution percentage 410 to the suggested contribution percentage 420.

In some examples, the transaction overview screen can include a user input field 440 to allow the user to enter, for example, salary data. The transaction overview screen can include a button 450 to enable the user to calculate a change in periodic earnings reduction amount (e.g., the amount that would be deducted from the user's 110 take-home pay), and a change in periodic employer contribution amount (e.g., the amount that would be contributed to the user's 110 plan account as a result of the employer match), based on the suggested contribution percentage 420. When the user 110 clicks the button 450, the application 143 can determine the change in periodic earnings reduction amount 470 and the change in periodic employer contribution amount 460 based on the suggested contribution percentage 420 and display those values 460 and 470 to the user 110 (as seen in FIG. 4B). In other examples, the application 143 can retrieve salary data associated with the user 110 from the database 146, determine the change in periodic earnings reduction amount 470 and the change in periodic employer contribution amount 460, and display those values 460 and 470 without requiring the user 110 to enter any additional information. In such examples, the screenshot illustrated in FIG. 4A would not be used and no user input would be needed to calculate the values 460 and 470. An advantage of these examples is the user 110 can view the impact that a change in the contribution percentage will have on his or her take-home pay and also see how much additional money he or she would receive from increased employer match contributions. As a result, the user can make a more informed decision on whether executing the transaction would result in a satisfactory adjustment of his or her contribution level to the defined contribution plan enabling him or her to take advantage of this "free money" employee benefit being offered.

Figure 5:
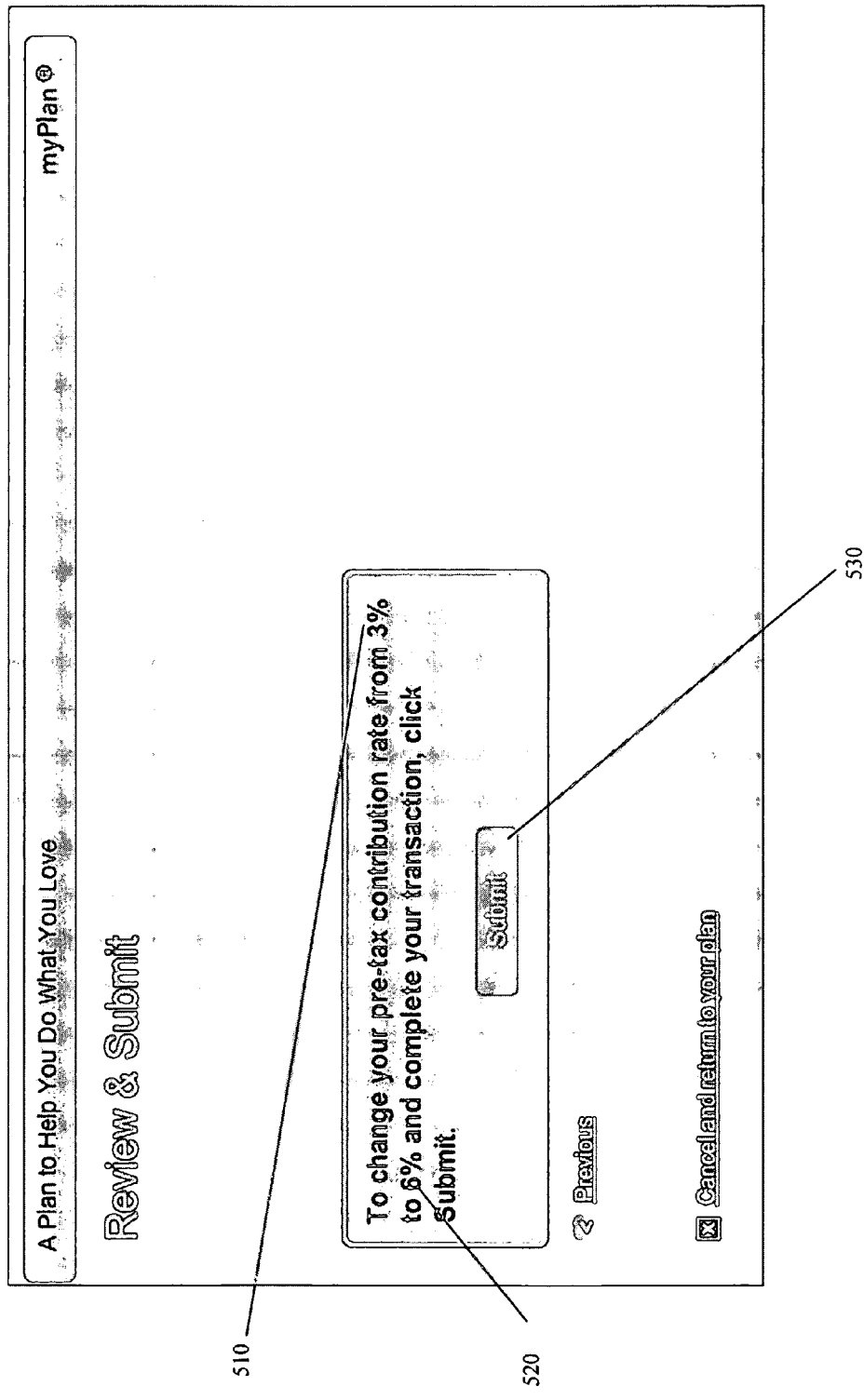
FIG. 5 is a screenshot of an exemplary user interface for reviewing a transaction changing a current contribution percentage to match a suggested contribution percentage.

FIG. 5 is a screenshot of a transaction review screen 500 of an exemplary user interface generated by the application 143. Upon clicking the button 430, the application 143 can display the transaction review screen 500. The transaction review screen 500 can include the current contribution percentage 510, the suggested contribution percentage 520, and a button 530 to enable the user 110 to execute the transaction to change the current contribution percentage 510 to the suggested contribution percentage 520 without entering any information. The only action the user 110 has to do is click on a button.

Figure 6:
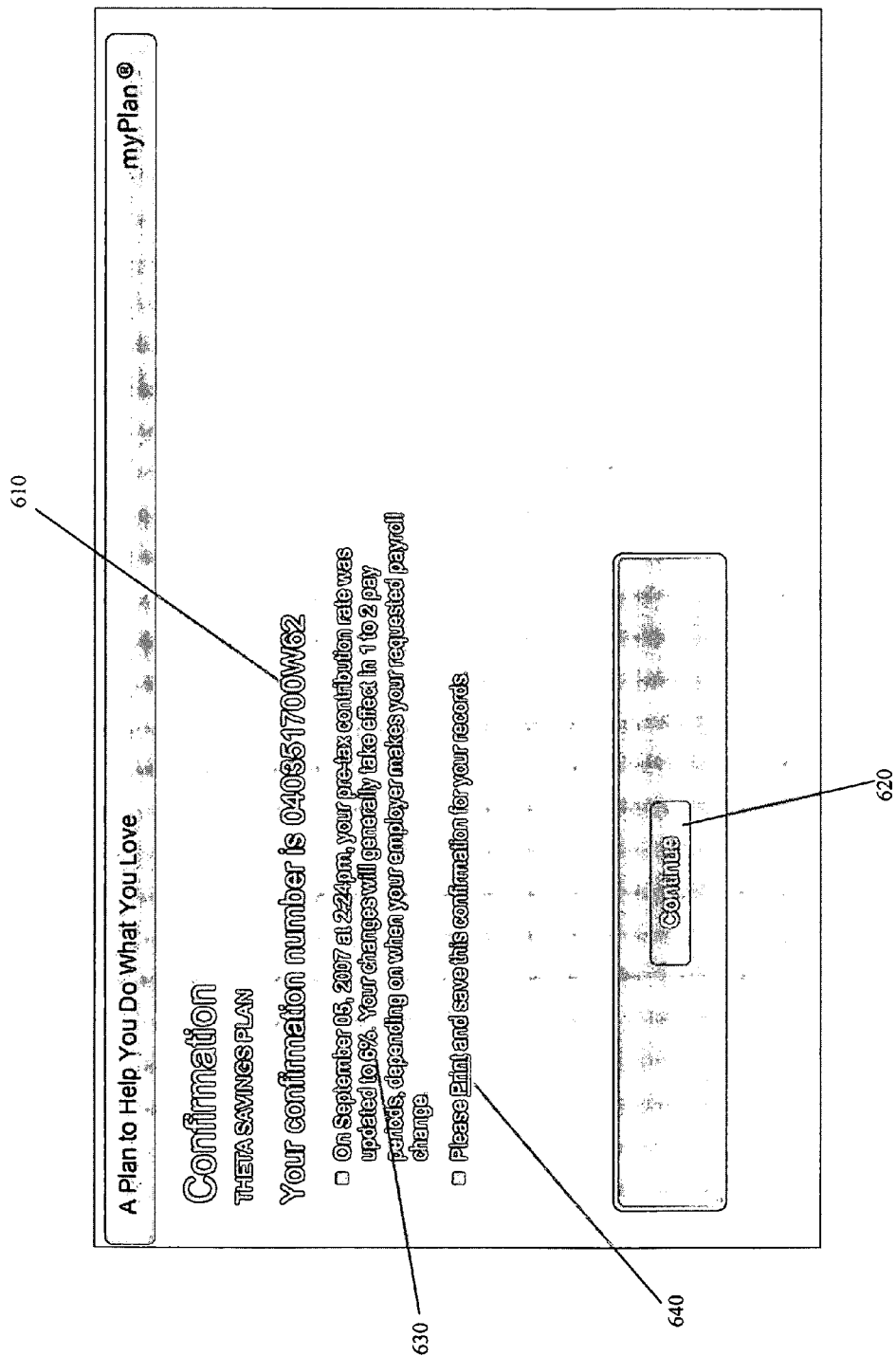
FIG. 6 is a screenshot of an exemplary user interface for displaying a confirmation of a transaction changing a current contribution percentage to match a suggested contribution percentage.

FIG. 6 is a screenshot of a transaction confirmation screen 600 of an exemplary user interface generated by the application 143. Upon clicking the button 530, the application 143 can display the transaction confirmation screen 600. The transaction confirmation screen 600 can include a confirmation number 610 and a button 620 to allow the user to continue with other transactions. The confirmation screen 600 also includes some information 630 summarizing the transaction that the user 110 has just completed. This information includes, for example, the date, time, percentage, effective date, and the like. The confirmation screen can also include a print button 640 so the user can print the confirmation screen 600 without any input but selecting the print button 640.

FIGS. 7 through 10 are screenshots of an exemplary user interface for guiding a user through a transaction to change a contribution percentage to a suggested match percentage beyond the employer match percentage in a defined contribution plan. The screenshots are generated by the application 143 and displayed on the client device 120 of FIG. 1.

Figure 7:
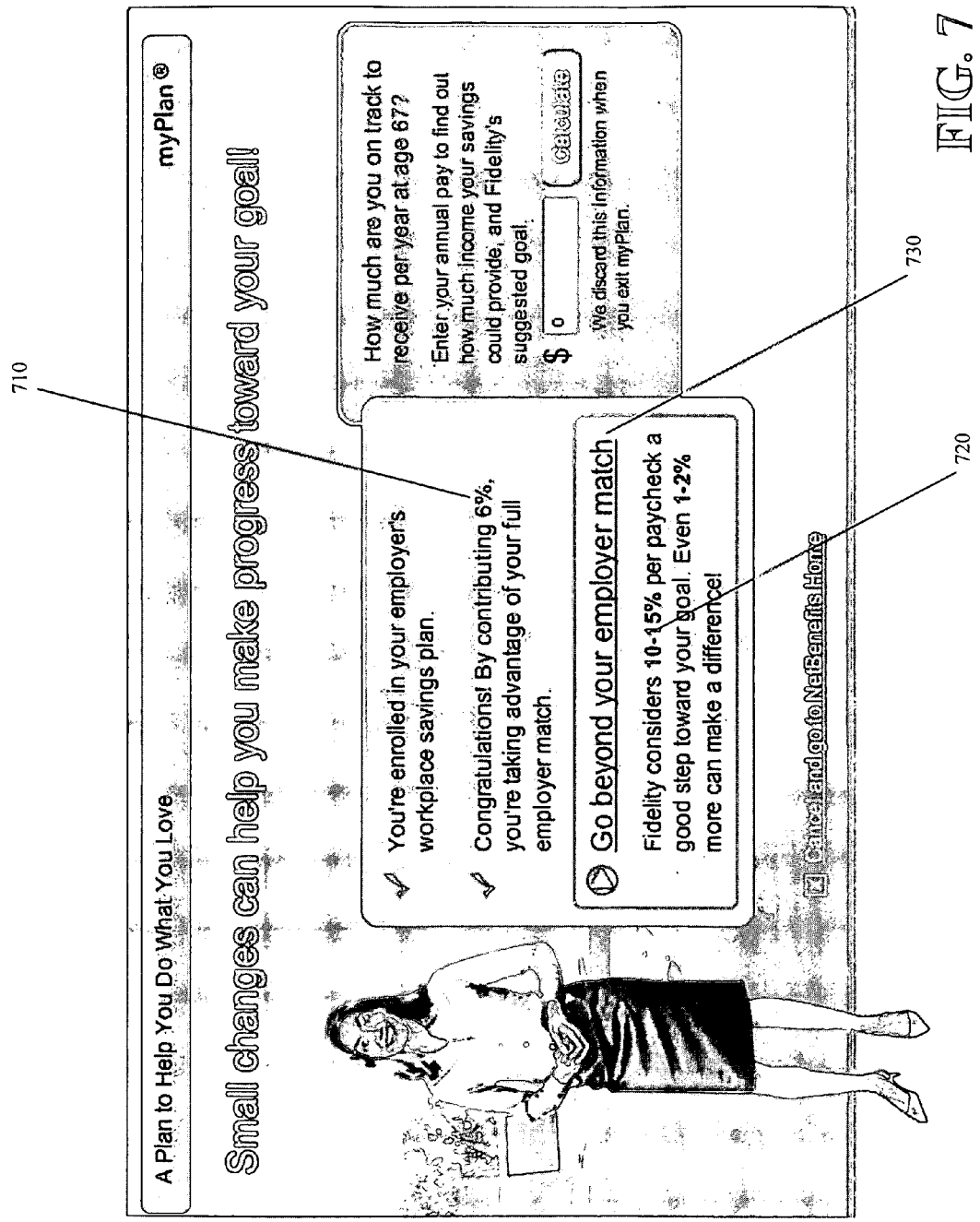
FIG. 7 is a screenshot of an exemplary user interface for initiating a transaction to change a contribution percentage in a defined contribution plan.

FIG. 7 is a screenshot of a transaction initiation screen 700 of an exemplary user interface generated by the application 143. For example, the transaction can be one to change a current contribution percentage 710 to a suggested contribution percentage 720 when the current contribution percentage 710 is equal to or greater than an employer match percentage, or alternatively when the employee is not eligible for an employer match (i.e., the employer does not provide any matching funds for the contribution plan). When the user 110 logs in to the application 143, the application 143 can generate user interface data being configured to cause the client device 120 to display the transaction initiation screen 700 after retrieving plan data associated with the user from a database 146. The transaction initiation screen 700 can display, for example, the user's current contribution percentage 710 and a button 730 to enable the user 110 to initiate a transaction to change the current contribution percentage 710 to a suggested contribution percentage 720 (e.g., suggested contribution 720) without requiring the user to enter any additional information. The only action the user 110 has to do is click on a button.

Figure 8A:
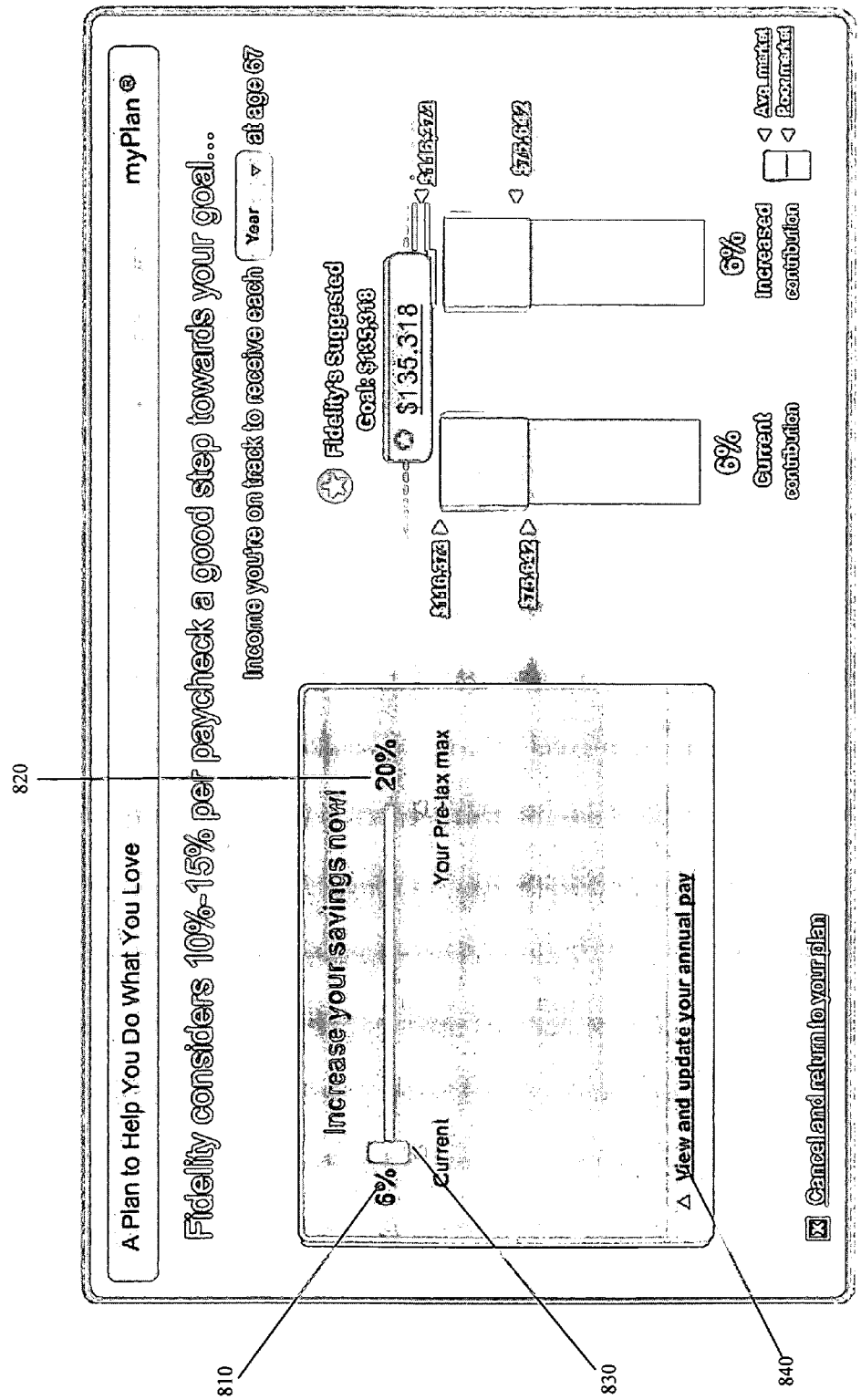
FIGS. 8A and 8B are screenshots of an exemplary user interface for displaying plan data, including a current contribution percentage, a suggested contribution percentage, and a graphical depiction of a projected future asset amount based on the suggested contribution percentage.
Figure 8B:
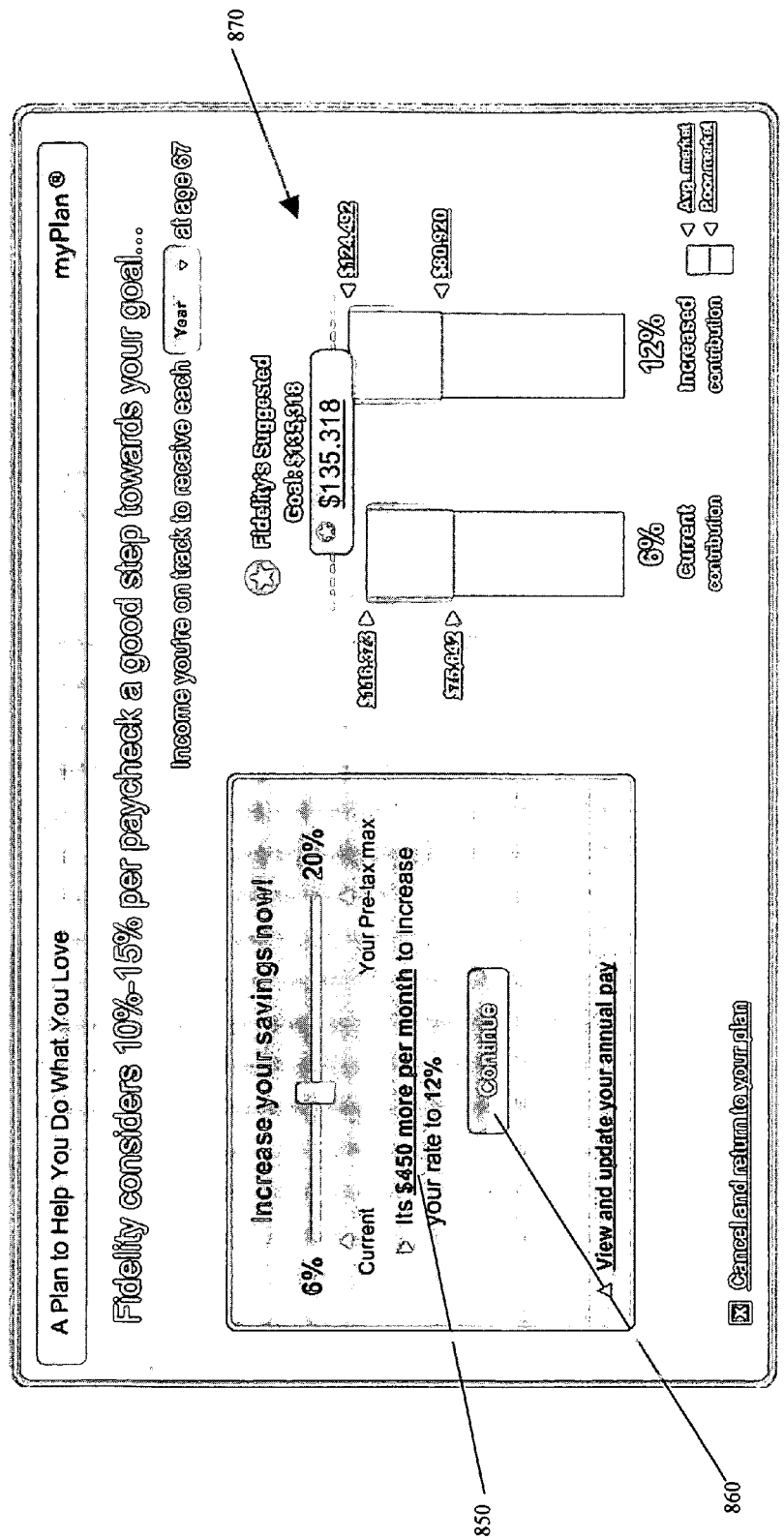

FIGS. 8A and 8B are screenshots of a transaction overview screen 800 of an exemplary user interface generated by the application 143. The screenshots represent the transaction overview screen 800 at different points based on an interaction made with the screen 800 by the user 110. When the user 110 clicks the button 730, the application 143 can display the contribution overview screen 800. The contribution overview screen 800 can include the current contribution percentage 810, the maximum suggested contribution percentage 820, and a slider button 830 comprising a range of available contribution percentage values, for example, from the current contribution percentage 810 to the maximum available contribution percentage 820. The maximum available contribution percentage 820 can be set, for example, according to rules of the specific contribution plan in which the user 110 participates, governmental rules, taxation rules (i.e., 402(g) deferral limit of $15,500 in 2008), or other similar criteria. The user 110 can move the slider button 830 (e.g., using a pointing input device) back and forth to change his suggested contribution percentage and see the impact on his potential retirement savings available at retirement age (e.g., in a graphical representation). Once the user 110 has selected a suggested contribution percentage with the slider button 830, a button 860 can be displayed (as seen in FIG. 8B) which enables the user 110 to review the transaction to change the current contribution percentage 810 to the suggested contribution percentage 820 without any further input except clicking on buttons. In some examples, once the user 110 has selected a suggested contribution percentage with the slider button 830, a change in periodic earnings reduction amount 850 (e.g., $450) can be displayed.

In some examples, the transaction overview screen 800 can also include a change button 840. The change button 840 can enable the user to substitute temporary values for at least a portion of the user data. For example, the user 110 might decide that he would like to see the change in periodic earnings reduction amount and the potential future asset amount that would result from a change to his yearly salary. The user 110 could click on the change button 840 and enter a hypothetical salary amount (not shown) from which the application 143 can calculate the change in periodic earnings reduction amount 850 and the potential future asset amount based on that hypothetical salary.

In some examples, the transaction overview screen can include a graphical depiction 870 of a potential future asset amount based on the selection of a suggested contribution percentage 820 by the user 110. The transaction overview screen can include a change in periodic earnings reduction amount 850 that the user 110 would pay based on the selection of a suggested contribution percentage 820. When the user 110 selects a suggested contribution percentage with the slider button 830, the application 143 can instantly update the graphical depiction 870 to reflect how such a change would impact the potential future asset amount of the user 110. In updating the graphical depiction 870, the application 143 can consider a plurality of factors, such as current age, age at retirement (e.g., 67), length of retirement period, inflation rate, salary growth, additional employer contributions, historic market performance, income replacement, tax limitations, Social Security income, portfolio asset allocation, investment risk, and other factors. The application 143 can also include retirement savings goals and progress toward those goals in the graphical depiction 870 based on selection of the suggested contribution percentage 820. The application 143 can also provide a potential future asset amount based on hypothetical predictions of market and/or economic performance (e.g., future asset amount if market performs above average, on average, or below average). The application 143 can also display the potential future asset amount in different period lengths (e.g., yearly, monthly, weekly).

For example, the application 143 can display the graphical depiction 870 as a bar graph. One bar can be the potential future asset amount calculated from the current contribution percentage (i.e., 6%). Another bar can be the potential future asset amount calculated from a suggested contribution percentage set by the user 110 manipulating the slider button 830 (i.e. 12%). Each bar depicts a range of potential future asset amounts based on the probability of poor or average hypothetical market performance (i.e., $756,428 in a 'Poor Market' to $1,163,725 in an 'Average Market'). The graphical depiction 870 can show a suggested goal to which the user 110 can target his contribution percentage choice.

Figure 9:
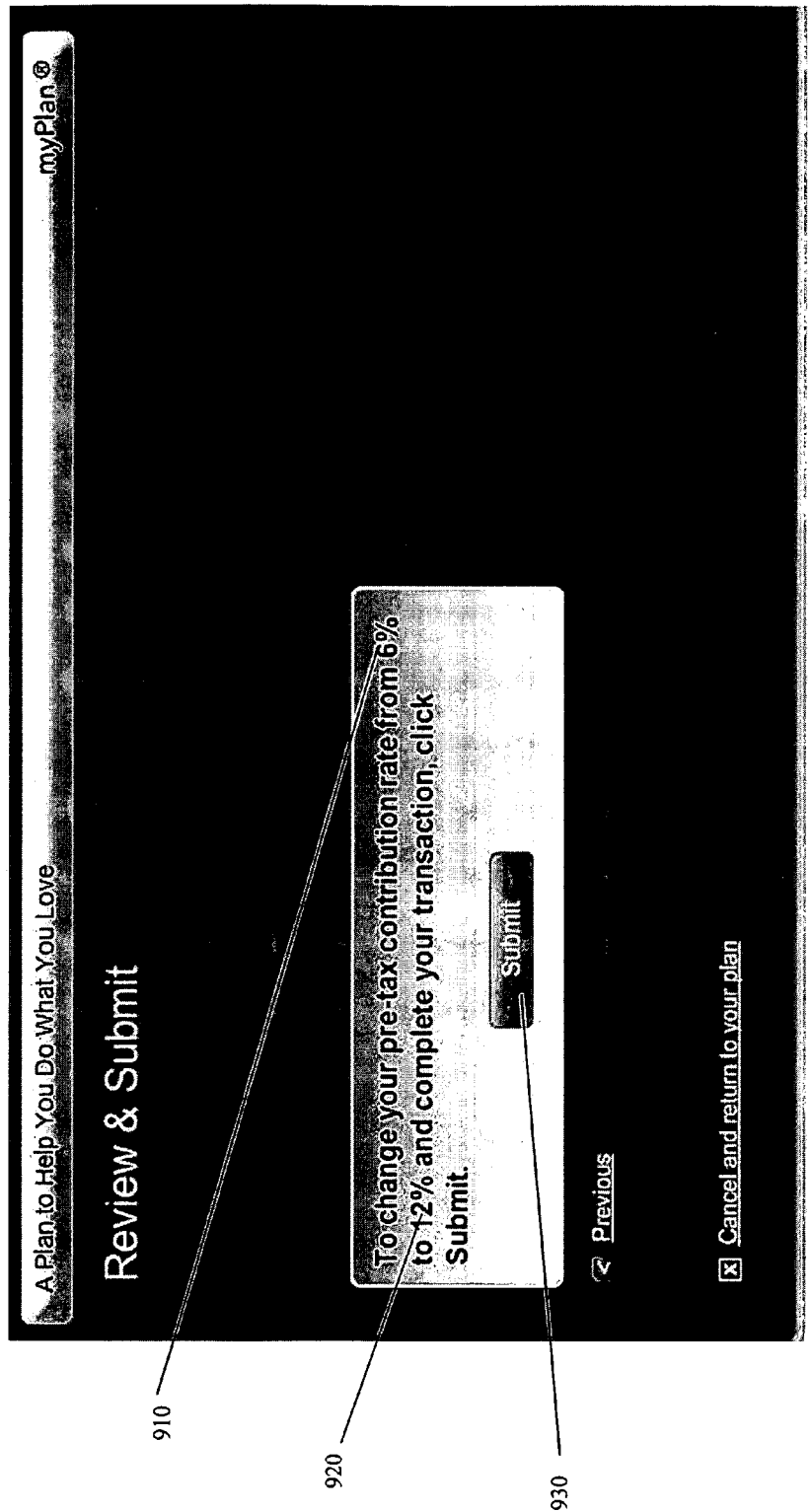
FIG. 9 is a screenshot of an exemplary user interface for reviewing a transaction to change a current contribution percentage to match a suggested contribution percentage.

FIG. 9 is a screenshot of a transaction review screen 900 of an exemplary user interface generated by the application 143. Upon clicking the button 860, the application 143 can display the transaction review screen 900. The transaction review screen 900 can include the current contribution percentage 910, the suggested contribution percentage 920, and a button 930 to enable the user 110 to execute the transaction to change the current contribution percentage 910 to the suggested contribution percentage 920. The only action the user has to do is click on a button without entering any information.

Figure 10:
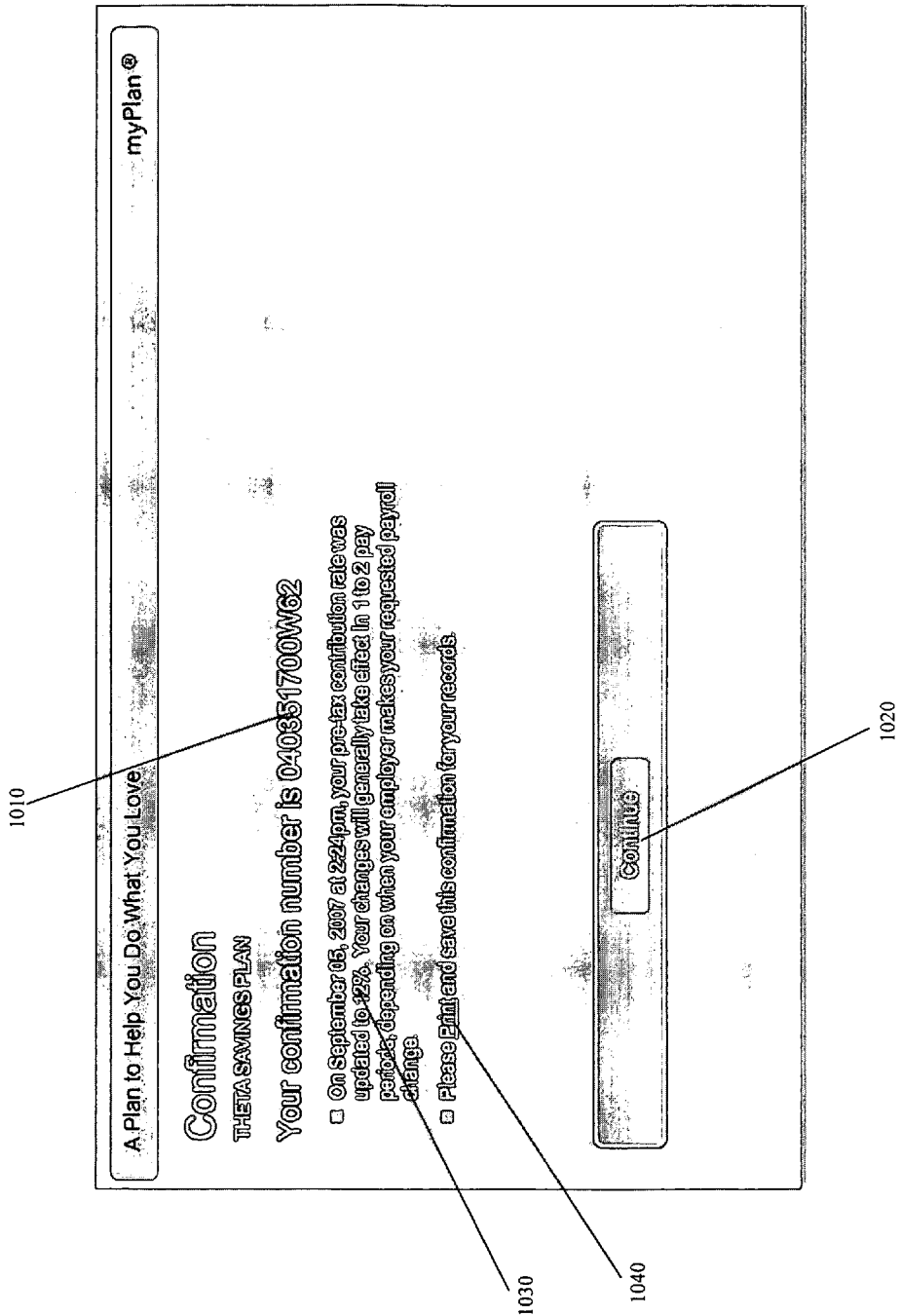
FIG. 10 is a screenshot of an exemplary user interface for displaying a confirmation of a transaction to change a current contribution percentage to match a suggested contribution percentage.

FIG. 10 is a screenshot of a transaction confirmation screen 1000 of an exemplary user interface generated by the application 143. Upon clicking the button 930, the application 143 can display the transaction confirmation screen 1000. The transaction confirmation screen 1000 can include a confirmation number 1010 and a button 1020 to allow the user to continue with other transactions. The confirmation screen 1000 also includes some information 1030 summarizing the transaction that the user 110 has just completed. This information includes, for example, the date, time, percentage, effective date, and the like. The confirmation screen can also include a print button 1040 so the user can print the confirmation screen 1000 without any input but selecting the print button 1040.

Figure 12:
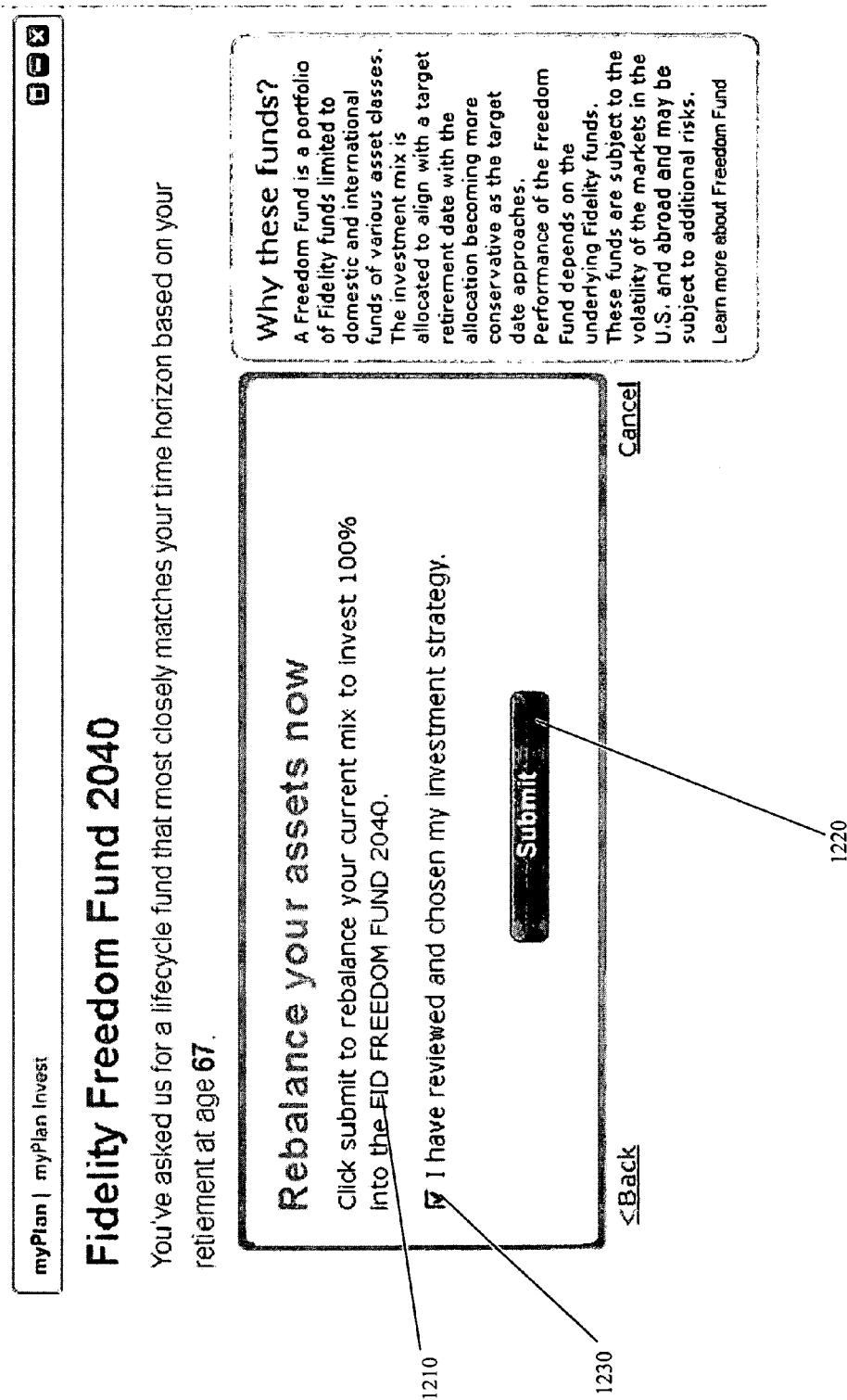
FIG. 12 is a screenshot of an exemplary user interface for reviewing a transaction to change a current investment selection to match a suggested age-appropriate investment selection.
Figure 13:
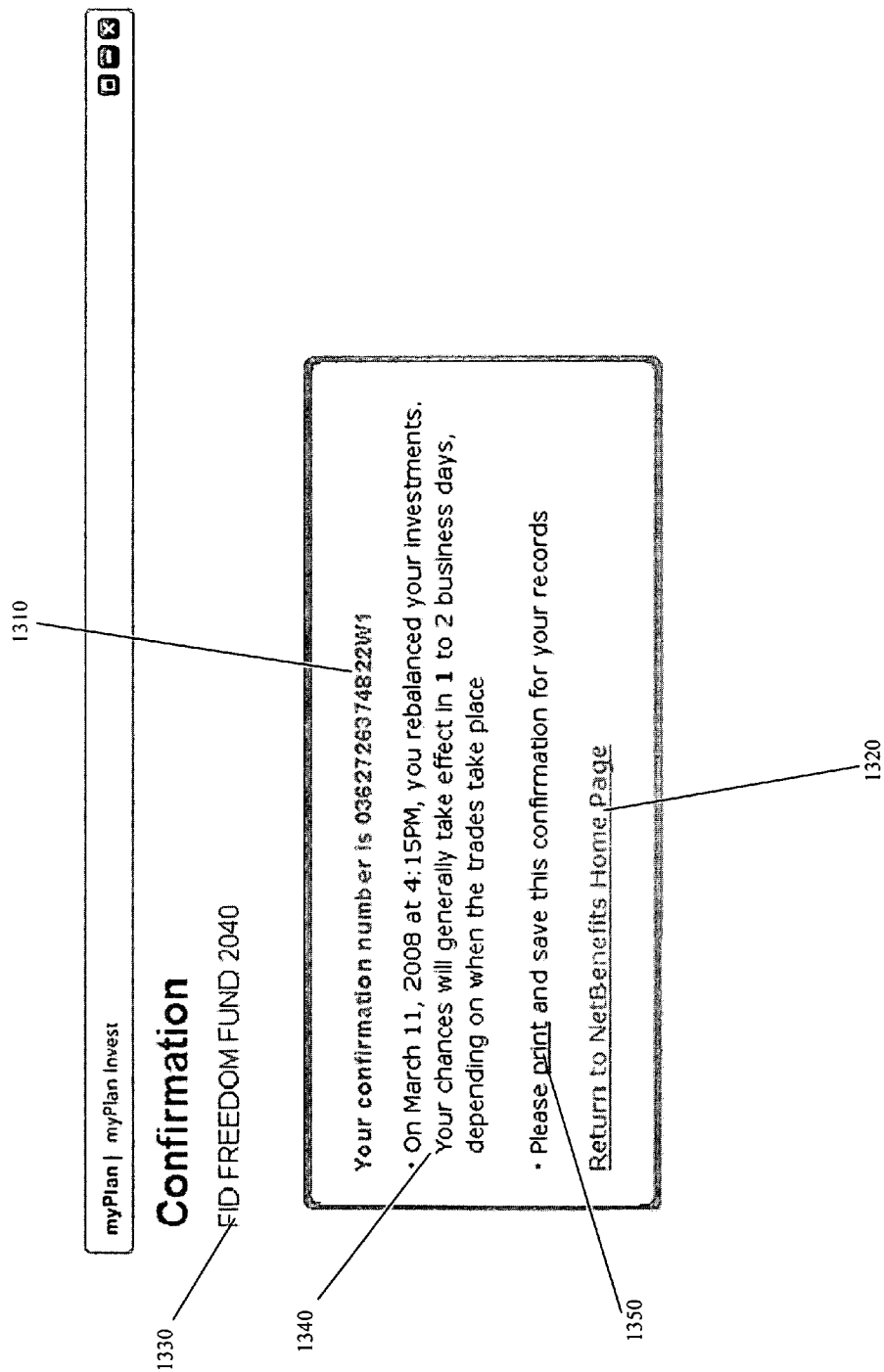
FIG. 13 is a screenshot of an exemplary user interface for displaying a confirmation of an investment change transaction updating a current investment selection to match a suggested investment selection.

FIGS. 11 through 13 are screenshots of an exemplary user interface for guiding a user through a transaction to change an investment selection in a defined contribution plan. The screenshots are generated by the application 143 and displayed on the client device 120 of FIG. 1.

FIG. 11 is a screenshot of a transaction initiation screen 1100 of an exemplary user interface generated by the application 143. For example, the transaction can be one to update a current investment selection to a suggested investment selection 1110. When the user 110 logs in to the application 143, the application 143 can generate user interface data being configured to cause the client device 120 to display the transaction initiation screen 1100 after retrieving plan data and participant data associated with the user 110 from a database 146. The transaction initiation screen 1100 can display, for example, a suggested investment selection 1110 and a button 1120 to enable the user 110 to initiate a transaction to change a current investment selection (e.g., represented by the phrase "your portfolio asset mix" displayed in FIG. 11) to a suggested investment selection (e.g., suggested investment selection 1110) without requiring the user to enter any additional information. The only action the user 110 has to do is click on a button.

The suggested investment selection 1110 can be determined based upon, for example, the current age and the age at retirement of the user 110. In some examples, the suggested investment selection 1110 can be a single investment vehicle such as an age-based lifecycle investment fund, or alternatively a mixed portfolio of a plurality of investment vehicles, created according to a predefined investment strategy based on a specific retirement date or retirement goals. For example, the suggested investment selection 1110 can be the Fidelity Freedom Fund 2040, or it can be a managed account from the Fidelity Portfolio Advisory Services, both offered by Fidelity Investments of Boston, Mass.

The suggested investment selection 1110 can be based on the age of the user 110. The asset allocation suggested can include aggressive, moderate, and/or conservative investment strategies based on the current age and age at retirement. For example, the application 143 may determine that a 30-year-old plan participant who is aiming to retire at age 67 should be assigned an aggressive risk profile because the length of time between now and retirement would allow the participant to take a greater risk of loss in order to reap maximum advantage from potential long-term market gains. Conversely, the application may determine that a 60-year-old plan participant retiring at age 67 should be assigned a conservative risk profile because such a short time between now and retirement suggests an approach of retaining existing plan assets and fostering modest growth with minimal risk of loss. In creating the suggested asset allocation, the application 143 can rebalance the current asset allocation based on an evaluation of the risk profile.

FIG. 12 is a screenshot of a transaction review screen 1200 of an exemplary user interface generated by the application 143. Upon clicking the button 1120, the application 143 can display the transaction review screen 1200. The transaction review screen 1200 can include the suggested investment selection 1210 with the appropriate asset allocation (e.g., FID FREEDOM FUND 2040, a fund whose asset allocation is dynamically managed for a target hypothetical investor who will retire in the year 2040), and a submit button 1220 to enable the user 110 to execute the transaction to change the current investment selection (e.g., the user's current asset allocation of funds in that user's account) to the suggested investment selection 1210. The only action the user has to do is click on a button without entering any information. In some embodiments, the transaction review screen 1200 can also include an investment selection sign-off check box 1230 to ensure that the user 110 has made an affirmative decision to change his or her investment selection and is aware of the consequences of making such a decision. The check box 1230 can be optionally preselected (i.e., checked off) when the transaction review screen 1200 is generated by the application 143, or the check box 1230 can be optionally not selected when the transaction review screen 1200 is generated. For example, government regulations may require that all users who wish to change their investment selections affirmatively click on the unselected check box to show that they intend to make such a change.

FIG. 13 is a screenshot of a transaction confirmation screen 1300 of an exemplary user interface generated by the application 143. Upon clicking the button 1220, the application 143 can display the transaction confirmation screen 1300. The transaction confirmation screen 1300 can include a confirmation number 1310, a button 1320 to allow the user to continue with other transactions, and the suggested (now current) investment selection 1330. The confirmation screen 1300 also includes some information 1340 summarizing the transaction that the user 110 has just completed. This information includes, for example, the date, time, investment selection, transaction effective date, and the like. The confirmation screen can also include a print button 1350 so the user can print the confirmation screen 1300 without any input but selecting the print button 1350.

Use Case 1—Guiding a User Through a Transaction to Update a Current Contribution Percentage to the Employer Match Percentage One use case of the application 143 can be when the user's 110 current contribution percentage is less than the employer's contribution match percentage. The application 143 can guide the user 110 through a series of simplified steps to increase his current contribution percentage to equal the employer match percentage.

For example, James Employee sits down at a client device 120 (e.g., computer, personal digital assistant, etc.) and logs in to the application 143. The application 143 receives (210) a request from James' client device 120 and retrieves (220) plan data from its database 146 based on James' user credentials. The application 143 generates (230) user interface data being configured to cause the client device 120 to display the transaction initiation screen 300, which includes his current contribution percentage 310 to his defined contribution plan. James sees that his current contribution percentage 310 is only 3%. The application 143 displays a suggested contribution percentage 320 based on data retrieved from the database 146 indicating that his employer will match his contribution percentage up to 6%. The application 143 can also provide a button 330 for James to click to initiate a transaction to change his current contribution percentage 310 in order to get his full employer match. James decides to increase his contribution percentage and thereby take advantage of his employer's matching contribution, so he clicks the button 330.

Upon clicking the button 330, the application 143 displays a transaction overview screen 400 to James containing at least his current contribution percentage 410 (e.g., 3%), the suggested contribution percentage 420 (e.g., 6%), and a button 430 enabling James to continue on and review the transaction. On this screen 400, James can decide simply to proceed with the transaction without entering any additional information by clicking the button 430. The system can automatically use the salary information it has access to or James can also enter his salary information in the user input box 440 provided and click the associated button 450 to view, for example, more detailed information about how much the change to his contribution percentage would increase the amount he contributes to his plan account and how much would be deducted from each paycheck before deciding whether to click the button 430 and continue with the transaction. In this example, James decides to click the button 430.

Upon clicking the button 430, the application 143 displays a transaction review screen 500 to James containing his current contribution percentage 510, the suggested contribution percentage 520, and a button 530 enabling James to execute the transaction which will change his current contribution percentage 510 to the suggested contribution percentage 520. Intent on making the change, James decides to execute the transaction and clicks the button 530.

Upon clicking the button 530, the application 143 displays a transaction confirmation screen 600 to James containing his suggested (and now current) contribution percentage 630, a confirmation number 610, a continue button 620, and a print button 640. Now James has completed the transaction and can close the application 143, click the print button 640 to print a confirmation of the transaction, or click the button 620 to explore other options.

Use Case 2—Guiding a User Through a Transaction to Update a Current Contribution Percentage Beyond the Employer Match Percentage Another use case of the application 143 can be when the user's 110 current contribution percentage is equal to or greater than the employer's contribution match percentage, or alternatively, when the employer does not provide any matching funds. The application 143 can guide the user 110 through a series of simplified steps to increase his current contribution percentage to any desired percentage (subject to possible limitations imposed by the contribution plan or other restrictions). The user 110 is encouraged to do so by seeing the calculation of his or her goal—how much would be needed at retirement versus how much is projected to be saved in the defined contribution plan at retirement, all without requiring any additional input from the user 110.

For example, Jennifer Employee sits down at a client 120 and logs into the application 143. The application 143 receives (210) a request from the client device 120 and retrieves (220) plan data from its database 146 based on Jennifer's user credentials. The application 143 generates (230) user interface data being configured to cause the client device 120 to display the transaction initiation screen 700, which includes her current contribution percentage 710 to her defined contribution plan. The application 143 notifies Jennifer that her current contribution percentage 710 has equaled the match percentage offered by her employer and displays a button 730 to allow Jennifer to initiate a transaction to update her current contribution percentage 710 above the present level. Jennifer chooses to update her contribution percentage, so she clicks the button 730.

When Jennifer clicks the button 730, the application 143 generates (240) a transaction overview screen 800 containing at least her current contribution percentage 810 (e.g., 6%), a suggested contribution range of percentages with a maximum 820 (e.g., 20%, representing the highest percentage allowed under the plan, based on, e.g., plan rules and/or tax laws), and a slider button 830 enabling Jennifer to select a desired contribution percentage within the allowable range. Jennifer decides to increase her contribution percentage to 12%, so she sets the slider button 830 equal to 12%. Upon doing so, the application 143 can, for example, display a periodic earnings reduction amount 850 associated with the contribution percentage increase set by the slider button 830. The application also displays a button 860 enabling Jennifer to review the transaction. The transaction overview screen 800 includes a graphical depiction 870 of how an increase to Jennifer's contribution percentage now would result in a change to her yearly retirement income at age 67. Using information represented by the graphical depiction, Jennifer can evaluate how the contribution percentage change affects, for example, her progress toward a potential retirement savings goal. The graphical depiction 870 changes according to the current setting of the slider button 830. For example, the "Increased Contribution" changed from 6% in FIG. 8A to 12% in FIG. 8B (along with the dollar amounts identified in the rightmost bar of the bar graph) after the setting of the slider button 830 was changed. After assessing the information on the transaction overview screen 800, Jennifer decides to proceed and clicks the button 860 to continue on and review the transaction.

Upon clicking the button 860, the application 143 displays a transaction review screen 900 that includes at least Jennifer's current contribution percentage 910, a suggested contribution percentage 920, and a button 930 enabling Jennifer to execute the transaction to change her contribution percentage. Jennifer then clicks the button 930 to go ahead and make the change to her contribution percentage.

Upon clicking the button 930, the application 143 displays a transaction confirmation screen 1000 to Jennifer containing her suggested (and now current) contribution percentage 1030, a confirmation number 1010, a continue button 1020, and a print button 1040. Now Jennifer has completed the transaction and can close the application 143, print a confirmation of the transaction by clicking the print button 1040, or click the continue button 1020 to explore other options.

Use Case 3—Guiding a User Through a Transaction to Update a Current Investment Selection to a Suggested Investment Selection Another use case of the application 143 can be when the user wants to change the allocation of funds in his or her contribution account. The application 143 can guide the user 110 through a series of simplified steps to change his or her current investment selection to a different investment selection based on the investment choices made available to the user 110 by his or her contribution plan. The suggested investment selection can be a predetermined investment fund based on information about the user (e.g., current age, age at retirement) or a portfolio apportionment based on a particular level of investment risk (e.g., aggressive, moderate, conservative) appropriate for the age of the participant and the target age of retirement of the participant.

For example, Juan Employee sits down at a client 120 and logs into the application 143. The application 143 receives (210) a request from the client device 120 and retrieves (220) plan data from its database 146 based on Juan's user credentials. The application 143 generates (230) user interface data being configured to cause the client device 120 to display the transaction initiation screen 1100 which includes a suggested investment selection 1110 in his defined contribution plan. The application 143 notifies Juan that his current investment selection may not be optimal, based on his current age and a potential age at retirement (i.e., age 67). The application 143 recommends that Juan select a new investment fund to pursue an aggressive-growth portfolio mix. As one option, the application 143 provides Juan with a button 1120 to initiate a transaction to change his current investment selection to the suggested investment selection 1110 (in this case, an age-based lifecycle fund such as "Freedom Fund 2040"). Juan decides to invest his plan assets in the Freedom Fund, so he clicks the button 1120 to continue. In some examples, the application 143 can notify Juan that his current investment selection is on target based on his current age and age at retirement, but that a managed account might be a preferable option. The application 143 can point Juan to more information about opening a managed account offered by his plan.

After clicking the button 1120, the application 143 displays a transaction review screen 1200 to Juan containing the suggested investment selection 1210 and a button 1220 enabling Juan to execute a transaction to change his current investment selection to the suggested investment selection. Juan wants to finalize the transaction, so he clicks the button 1220. In some examples, the transaction review screen 1200 contains an investment strategy sign-off check box 1230 which allows Juan to confirm that he is aware of the change he is about to make and of any potential consequences that could result. In order to continue, Juan can click on the check box 1230 and then click the button 1220 to proceed.

After clicking the button 1220, the application 143 displays a transaction confirmation screen 1300 to Juan containing a confirmation number 1310, his now-current investment selection 1330 and other information related to the transaction 1340 (such as date, time, transaction effective date, etc.). Now Juan has completed the transaction and can close the application 143, print a confirmation of the transaction by clicking the print button 1350, or click the button 1320 to explore other options.

The above-described use cases are examples of functionality of the application 143. However, the use cases need not be mutually exclusive. For example, James Employee could complete the steps as described in Use Case 1 and then decide to change his contribution percentage even further. Upon clicking the button 630, the application 143 can display the transaction initiation screen 700 described in Use Case 2. James can then complete the steps as described in Use Case 2 to change his contribution percentage again. At the end of that process, the application 143 can display the button 1030 which could display the transaction initiation screen 1200 described in Use Case 3. James can then complete the steps as described in Use Case 3 to change his investment selection. Additionally, James could change his contribution percentage and his investment selection independently and in any order he chooses.

The above-described systems and methods can be implemented in digital electronic circuitry, in computer hardware, firmware, and/or software. The implementation can be as a computer program product (i.e., a computer program tangibly embodied in a computer readable medium). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Computer readable mediums suitable for embodying computer program instructions and data include all forms of non-volatile memory, including by way of example semiconductor memory devices. The computer readable mediums can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device or a transmitting device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The client device and the computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

The web servers can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage modules can be, for example, a computer with a database module (e.g., Microsoft® SQL Server 2008 available from Microsoft Corporation, Oracle Database 11g available from Oracle Corporation).

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network).

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

We claim:

1. A computerized method for guiding a user through a transaction to change a contribution configuration in a defined contribution plan, the method comprising:

receiving, at a server device, a request from a client device, the request including credentials associated with a user;

retrieving, by the server device and based on the credentials, plan data from a storage module, the plan data including at least a current contribution percentage;

determining, by the server device, a first suggested contribution percentage without any additional user input, the first suggested contribution percentage based on at least a portion of the plan data and equal to an employer match contribution percentage;

transmitting, by the server device, first user interface data to the client device, the first user interface data being configured to cause the client device to display a user interface frame consisting of the current contribution percentage, the first suggested contribution percentage, a first yearly employer contribution amount, a first monthly earnings reduction amount, and a first button enabling the user to initiate a transaction to change the current contribution percentage to the first suggested contribution percentage without requiring the user to enter any additional information;

executing, by the server device in response to receiving information indicative of clicking the displayed first button, a first transaction to change the current contribution percentage to the first suggested contribution percentage;

transmitting, by the server device, first confirmation data to the client device, the first confirmation data being configured to cause the client device to display a user interface frame consisting of a confirmation of the first transaction without any additional user input, the confirmation including a first confirmation number, the first suggested contribution percentage, and a schedule for an initiation of an earnings reduction based on the first suggested contribution percentage;

determining, by the server device in response to a user request, a second suggested contribution percentage without any additional user input based on at least a portion of the plan data and greater than the employer match contribution percentage;

transmitting, by the server device, second user interface data to the client device, the second user interface data consisting of the current contribution percentage, the second suggested contribution percentage, a maximum allowable contribution percentage, a slider interface element configured to allow selection of a percentage value between the current contribution percentage and the maximum allowable contribution percentage, a bar graph operably connected to the slider interface element and displaying (i) a minimum amount of income and a maximum amount of income to be received per year at a specified age based on the current contribution percentage and (ii) a minimum amount of income and a maximum amount of income to be received per year at a specified age based on the selected percentage value of the slider interface element, and a second button enabling the user to initiate a transaction to change the current contribution percentage to the second suggested contribution percentage without requiring the user to enter any additional information;

executing, by the server device in response to receiving information indicative of clicking the displayed second button, a second transaction to change the current contribution percentage to the second suggested contribution percentage; and transmitting, by the server device, second confirmation data to the client device, the second confirmation data being configured to cause the client device to display a user interface frame comprising a confirmation of the second transaction without any additional user input, the confirmation consisting of a second confirmation number, the second suggested contribution percentage, and a schedule for an initiation of an earnings reduction based on the second suggested contribution percentage.

2. The method of claim 1, wherein the current contribution percentage represents an apportionment of money contributed by a participant to a defined contribution account in a defined contribution plan.

3. The method of claim 1, wherein the plan data includes a current investment selection.

4. The method of claim 3, further comprising:

retrieving, by the server device, a current age of the user and an age at retirement of the user from a database;

determining, by the server device, a suggested investment selection based on the current investment selection and the current age and age at retirement;

transmitting, by the server device, user interface data to the client device, the user interface data being configured to cause the client device to display the suggested investment selection and an execution button enabling the user to execute the transaction to change the current investment selection to the suggested investment selection without any additional user input;

executing, by the server device in response to receiving information indicative of clicking the execution button, a transaction to change the current investment selection to the suggested investment selection; and transmitting, by the server device, confirmation data to the client device, the confirmation data being configured to cause the client device to display a user interface frame comprising a confirmation of the transaction to change the current investment selection to the suggested investment selection without any additional user input, the confirmation consisting of a confirmation number, the suggested investment selection, and a schedule for an initiation of an earnings reduction based on the suggested investment selection.

5. The method of claim 4, wherein the investment selection is an age-based lifecycle fund.

6. The method of claim 4, wherein determining a suggested investment selection further comprises:

determining, by the server device, an age-based time horizon and/or a risk profile of the user, the age-based time horizon and/or risk profile based on the current age and the age at retirement; and adjusting, by the server device, the suggested investment selection based on the age-based time horizon and/or risk profile.

7. The method of claim 6, wherein the risk profile includes an aggressive investment risk strategy, a moderate investment risk strategy, a conservative investment risk strategy, or any combination thereof.

8. The method of claim 1, further comprising determining, by the server device, a suggested investment selection based on the plan data.

9. The method of claim 1, further comprising:

transmitting, in response to receiving information indicative of clicking the first button, review user interface data to the client device, the review user interface data being configured to cause the client device to display a user interface frame consisting of the current contribution configuration, the first suggested contribution configuration, and a review button enabling the user to confirm completion of a review of the transaction to change the current contribution percentage to the first suggested contribution percentage without requiring the user to enter any additional information.

10. The method of claim 1, the method further comprising:
retrieving, by the server device, salary data associated with the user from a database;
determining, by the server device, the yearly earnings reduction amount associated with the first suggested contribution percentage and the monthly employer contribution amount associated with the first suggested contribution percentage based on the salary data.

11. The method of claim 1, the method further comprising:
receiving, by the server device, input from the client device, the input including salary data entered by the user; and
determining, by the server device in response to receiving information indicative of clicking a salary button, the first yearly earnings reduction amount and the first monthly employer contribution amount based on the salary data.

12. The method of claim 1, the method further comprising:
transmitting, by the server device, user interface data to the client device, the user interface data being configured to cause the client device to display a graphical depiction of a projected future asset amount based on the first suggested contribution percentage.

13. The method of claim 12, wherein the projected future asset amount is determined according to current age, age at retirement, length of retirement period, goal amount, savings to date, inflation rate, salary growth, additional employer contributions, historic market performance, income replacement, tax limitations, Social Security income, portfolio asset allocation, investment risk, or any combination thereof.

14. The method of claim 1, the method further comprising:
retrieving, by the server device, an employer match percentage from a database;
determining, by the server device, whether the current contribution percentage is less than, equal to or greater than the employer match percentage.

15. The method of claim 1, wherein the user interface includes a button to cancel an unexecuted change.

16. A computer program product, tangibly embodied in a non-transitory computer readable medium, for guiding a user through a transaction to update a contribution configuration in a defined contribution plan, the computer program product including instructions being operable to cause a data processing apparatus to:
receive a request from a client device, the request including credentials associated with a user;
retrieve, based on the credentials, plan data from a storage module, the plan data including at least a current contribution percentage;
determine a first suggested contribution percentage without any additional user input, the first suggested contribution percentage based on at least a portion of the plan data and equal to an employer match contribution percentage;
transmit first user interface data to the client device, the first user interface data being configured to cause the client device to display a user interface frame consisting of the current contribution percentage, the first suggested contribution percentage, a first yearly employer contribution amount, a first monthly earnings reduction amount, and a first button enabling the user to initiate a transaction to change the current contribution percentage to the first suggested contribution percentage without requiring the user to enter any additional information;
execute, in response to receiving information indicative of clicking the displayed first button, a first transaction to change the current contribution percentage to the first suggested contribution percentage;
transmit first confirmation data to the client device, the first confirmation data being configured to cause the client device to display a user interface frame comprising a confirmation of the first transaction without any additional user input, the confirmation consisting of a first confirmation number, the first suggested contribution percentage, and a schedule for an initiation of an earnings reduction based on the first suggested contribution percentage;
determine, in response to a user request, a second suggested contribution percentage without any additional user input, the second suggested contribution percentage based on at least a portion of the plan data and greater than the employer match contribution percentage;
transmit second user interface data to the client device, the second user interface data being configured to cause the client device to display a user interface frame consisting of the current contribution percentage, the second suggested contribution percentage, a maximum allowable contribution percentage, a slider interface element configured to allow selection of a percentage value between the current contribution percentage and the maximum allowable contribution percentage, a bar graph operably connected to the slider interface element and displaying (i) a minimum amount of income and a maximum amount of income to be received per year at a specified age based on the current contribution percentage and (ii) a minimum amount of income and a maximum amount of income to be received per year at a specified age based on the selected percentage value of the slider interface element, and a second button enabling the user to initiate a transaction to change the current contribution percentage to the second suggested contribution percentage without requiring the user to enter any additional information;
execute, in response to receiving information indicative of clicking the displayed second button, a second transaction to change the current contribution percentage to the second suggested contribution percentage; and
transmit second confirmation data to the client device, the second confirmation data being configured to cause the client device to display a user interface frame comprising a confirmation of the second transaction without any additional user input, the confirmation consisting of a second confirmation number, the second suggested contribution percentage, and a schedule for an initiation of an earnings reduction based on the second suggested contribution percentage.

17. A system for guiding a user through a transaction to update a contribution configuration in a defined contribution plan, the system comprising:
a server device configured to:
receive a request from a client device, the request including credentials associated with a user;
retrieve, based on the credentials, plan data from a storage module, the plan data including at least a current contribution percentage;

determine a first suggested contribution percentage without any additional user input, the first suggested contribution percentage based on at least a portion of the plan data and equal to an employer match contribution percentage;

transmit first user interface data to the client device, the first user interface data being configured to cause the client device to display a user interface frame consisting of the current contribution percentage, the first suggested contribution percentage, a first yearly employer contribution amount, a first monthly earnings reduction amount, and a first button, the first button enabling the user to initiate a first transaction to change the current contribution percentage to the first suggested contribution percentage without requiring the user to enter any additional information;

execute, in response to receiving information indicative of clicking the displayed first button, the first transaction to change the current contribution percentage to the first suggested contribution percentage;

transmit confirmation data to the client device, the confirmation data being configured to cause the client device to display a user interface comprising a confirmation of the first transaction without any additional user input, the confirmation of the first transaction consisting of a first confirmation number, the first suggested contribution percentage, and a schedule for an initiation of an earnings reduction based on the first suggested contribution percentage;

determine, in response to a user request, a second suggested contribution percentage without any additional user input, the second suggested contribution percentage based on at least a portion of the plan data and greater than the employer match contribution percentage;

transmit second user interface data to the client device, the second user interface data being configured to cause the client device to display a user interface frame consisting of the current contribution percentage, the second suggested contribution percentage, a maximum allowable contribution percentage, a slider interface element configured to allow selection of a percentage value between the current contribution percentage and the maximum allowable contribution percentage, a bar graph operably connected to the slider interface element and displaying (i) a minimum amount of income and a maximum amount of income to be received per year at a specified age based on the current contribution percentage and (ii) a minimum amount of income and a maximum amount of income to be received per year at a specified age based on the selected percentage value of the slider interface element, and a second button enabling the user to initiate a transaction to change the current contribution percentage to the second suggested contribution percentage without requiring the user to enter any additional information;

execute, in response to receiving information indicative of clicking the displayed second button, a second transaction to change the current contribution percentage to the second suggested contribution percentage; and transmit second confirmation data to the client device, the second confirmation data being configured to cause the client device to display a user interface frame comprising a confirmation of the second transaction without any additional user input, the confirmation consisting of a second confirmation number, the second suggested contribution percentage, and a schedule for an initiation of an earnings reduction based on the second suggested contribution percentage.

* * * * *